(12) United States Patent
Kim et al.

(10) Patent No.: US 11,808,918 B2
(45) Date of Patent: Nov. 7, 2023

(54) META-SURFACE OPTICAL ELEMENT AND METHOD OF MANUFACTURING THE SAME

(71) Applicant: SAMSUNG ELECTRONICS CO., LTD., Suwon-si (KR)

(72) Inventors: Jaekwan Kim, Hwaseong-si (KR);
Jeongyub Lee, Yongin-si (KR);
Seunghoon Han, Seoul (KR);
Yongsung Kim, Suwon-si (KR);
Byunghoon Na, Suwon-si (KR);
Jangwoo You, Seoul (KR);
Changseung Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/499,170

(22) Filed: Oct. 12, 2021

(65) Prior Publication Data

US 2022/0026605 A1 Jan. 27, 2022

Related U.S. Application Data

(63) Continuation of application No. 16/020,434, filed on Jun. 27, 2018, now abandoned.

(30) Foreign Application Priority Data

Sep. 21, 2017 (KR) .................. 10-2017-0121873

(51) Int. Cl.
*G02B 6/32* (2006.01)
*G02B 1/00* (2006.01)
(Continued)

(52) U.S. Cl.
CPC ............. *G02B 1/002* (2013.01); *G02B 5/005* (2013.01); *G02B 5/1814* (2013.01); *G02B 27/4211* (2013.01); *B82Y 20/00* (2013.01)

(58) Field of Classification Search
CPC ...... G02B 1/002; G02B 27/4211; G02B 5/22; G02B 5/25; B82Y 20/00
See application file for complete search history.

(56) References Cited

U.S. PATENT DOCUMENTS 7,745,237 B2 * 6/2010 Katagiri ............... G03F 9/7088
264/408
8,149,892 B2 4/2012 Nagatomo et al.
(Continued)

FOREIGN PATENT DOCUMENTS

JP 2003-273456 A 9/2003
JP 4338211 B2 10/2009
(Continued)

OTHER PUBLICATIONS

Isabelle Staude et al. "Tailoring Directional Scattering through Magnetic and Electric Resonances in Subwavelength Silicon Nanodisks" ACS NANO, vol. 7, No. 9, Sep. 24, 2013 (pp. 7824-7832).
(Continued)

*Primary Examiner* — Audrey Y Chang
(74) *Attorney, Agent, or Firm* — Sughrue Mion, PLLC

(57) ABSTRACT

Provided are meta-surface optical device and methods of manufacturing the same. The meta-surface optical device may include a meta-surface arranged on a region of a substrate and a light control member arranged around the meta-surface. The light control member may be arranged on or below the substrate. A material layer formed of the same material used to form the meta-surface may be disposed between the light control member and the substrate. Also, the meta-surface may be a first meta-surface arranged on an upper surface of the substrate, and a second meta-surface may be arranged on a bottom surface of the substrate. Also, the meta-surface may include a first meta-surface and at least one second meta-surface may formed on the first
(Continued)

US 11,808,918 B2

Page 2 meta-surface, and the light control member may be arranged around the at least one second meta-surface.

18 Claims, 32 Drawing Sheets

(51) Int. Cl.
*G02B 27/42* (2006.01)
*G02B 5/00* (2006.01)
*G02B 5/18* (2006.01)
*B82Y 20/00* (2011.01)

(56) References Cited

U.S. PATENT DOCUMENTS

| | | | |
|---|---|---|---|
| 9,151,891 B2* | 10/2015 | Ma | B82Y 20/00 |
| 2006/0215269 A1* | 9/2006 | Abe | G02B 3/0012 |
| | | | 359/619 |
| 2013/0143149 A1 | 6/2013 | Kang et al. | |
| 2015/0085522 A1 | 3/2015 | Im et al. | |
| 2015/0219806 A1 | 8/2015 | Arbabi et al. | |
| 2016/0033857 A1 | 2/2016 | Son et al. | |
| 2016/0146989 A1 | 5/2016 | Sakat et al. | |
| 2016/0197106 A1 | 7/2016 | Park et al. | |
| 2016/0299337 A1 | 10/2016 | Arbabi et al. | |
| 2017/0063039 A1 | 3/2017 | Sinclair et al. | |
| 2017/0075210 A1 | 3/2017 | Shishido et al. | |
| 2017/0235162 A1 | 8/2017 | Shaltout et al. | |
| 2018/0067041 A1 | 3/2018 | Ogawa et al. | |
| 2020/0018684 A1 | 1/2020 | Vercruysse | |

FOREIGN PATENT DOCUMENTS

| | | |
|---|---|---|
| JP | WO2016/167052 A1 | 4/2017 |
| KR | 10-0925614 B1 | 11/2009 |
| KR | 10-1542109 B1 | 8/2015 |
| KR | 10-2016-0017292 A | 2/2016 |

OTHER PUBLICATIONS

Communication dated Feb. 8, 2019, from the European Patent Office in counterpart European Application No. 18194336.6.
Amir Arbabi et al. "Subwavelength-thick lenses with high numerical apertures and large efficiency based on high-contrast transmit arrays" Nature Communications, vol. 6, May 7, 2015 (pp. 1-6).
Yong Zhang et al. "Ultra-broadband and strongly enhanced diffraction with metasurfaces" Scientific Reports, vol. 5, May 14, 2015 (pp. 1-7).
Communication dated Sep. 23, 2019, issued by the European Patent Office in counterpart European Application No. 18194336.6.
Communication dated Apr. 22, 2022, issued by the Korean Intellectual Property Office in Korean Patent Application No. 10-2017-0121873.
Arbabi et al., "Miniature optical planar camera based on a wide-angle metasurface doublet corrected for monochromatic aberrations," Nature Communications, DOI: 10.1038/ncomms13682, Nov. 28, 2016, Total 9 pages.
Communication dated Sep. 29, 2022 by the Korean Intellectual Property Office for Korean Patent Application No. 10-2017-0121873.
Arbabi et al., "Multiwavelength polarization-insensitive lenses based on dielectric metasurfaces with meta-molecules", Jun. 2016, OPTICA Society of America, vol. 3, No. 6, 6 pages total.
Communication dated Apr. 25, 2023 by the Korean Intellectual Property Office for Korean Patent Application No. 10-2017-0121873.

* cited by examiner

META-SURFACE OPTICAL ELEMENT AND METHOD OF MANUFACTURING THE SAME

CROSS-REFERENCE TO RELATED APPLICATION

This application is a Continuation of U.S. application Ser. No. 16/020,434, filed Jun. 27, 2018, which claims priority from Korean Patent Application No. 10-2017-0121873, filed on Sep. 21, 2017, in the Korean Intellectual Property Office, the disclosure of which is incorporated herein in its entirety by reference.

BACKGROUND

1. Field

Apparatuses and methods consistent with exemplary embodiments relate to optical elements, and more particularly, to meta-surface optical elements and methods of manufacturing the same.

2. Description of the Related Art

In order to overcome the limit of related art optical techniques, a technique that uses a meta-surface has been developed. When an optical part having a meta-surface is used, the size of the element may be reduced, and also, optical efficiency and resolution may be increased as compared to a conventional optical element.

A meta-surface includes a plurality of patterns. Optical characteristics of a meta-surface vary according to the specific nano-structure patterns used in the meta-surface. A phase delay may be created based on the radius of the patterns of the meta-surface, and a lens may be realized using a meta-surface based on this phase delay.

SUMMARY

One or more exemplary embodiments may provide meta-surface optical elements configured to reduce a zero-order effect.

One or more exemplary embodiments may provide methods of manufacturing the meta-surface optical elements.

Additional exemplary aspects will be set forth in part in the description which follows and, in part, will be apparent from the description, or may be learned by practice of the presented exemplary embodiments.

According to an aspect of an exemplary embodiment, a meta-surface optical element includes a substrate, a first meta-surface arranged on a region of the substrate, and a light control member arranged around the first meta-surface.

The light control member may be arranged on an upper surface or a bottom surface of the substrate.

The meta-surface optical element may further include a material layer, that is the same material as the first meta-surface disposed between the light control member and the substrate.

The meta-surface optical element may further include a material layer completely covering an upper surface of the light control member.

The meta-surface optical element may further include a second meta-surface on a bottom surface of the substrate.

At least one second meta-surface may be stacked on the first meta-surface, and the light control member may be arranged around the at least one second meta-surface.

The light control member may be a light absorption layer or a light reflection layer.

The light control member may include a plurality of patterns that perform a first operation with respect to light incident thereon different from a second operation performed by the first meta-surface with respect to light incident thereon.

The light control member may include a first plurality of patterns that perform a first operation with respect to light incident thereon and a second plurality of patterns that perform a second operation, different from the first operation, with respect to light incident thereon, and the first meta-surface may perform a third operation, different from the first operation and the second operation, with respect to light incident thereon.

The material layer may include alignment key patterns.

The meta-surface optical element may further include a second light control member around the second meta-surface.

The second meta-surface may include a plurality of patterns that perform an operation, with respect to light incident thereon, different from an operation performed by the first meta-surface with respect to light incident thereon.

The first meta-surface and the light control member having a gap therebetween, the gap having a width less than six times a wavelength of incident light. For example the width of the gap may be equal to or less than 5 µm.

The first meta-surface and the light control member may overlap each other with a width of the overlap being less than ten times a wavelength of incident light. For example, the width of the overlap may be equal to or less than 9 µm.

According to an aspect of another exemplary embodiment, a method of manufacturing a meta-surface optical element is provided, the method including forming a meta-surface on a substrate and forming alight control member around the meta-surface.

The light control member may be separated from an upper surface of the substrate.

The light control member may contact the upper surface of the substrate.

The light control member may be formed on a bottom surface of the substrate.

The light control member may be formed on and below the substrate.

The forming of the meta-surface on the substrate may include sequentially forming first and second meta-surfaces on the substrate.

The method may further include forming another meta-surface below the substrate.

The meta-surface and the light control member may be formed on the same surface of the substrate.

The meta-surface and the light control member may be formed on different surfaces from each other of the substrate.

The light control member may include a first part that performs a first operation with respect to light incident thereon and a second part that performs a second operation, different from the first operation, with respect to light incident thereon.

The light control member may include a light absorption layer or a light reflection layer.

The light control member may include patterns that absorb, reflect, or refract incident light.

The light control member may be formed to be separate from the meta-surface with a separation distance that is less than six times of a wavelength of incident light. For example, the separation distance may be less than or equal to 5 µm.

The light control member and the meta-surface may overlap with each other with an overlap width that is less than ten times of a wavelength of incident light. For example, the overlap width may be less than or equal to 9 µm.

BRIEF DESCRIPTION OF THE DRAWINGS

These and/or other exemplary aspects and advantages will become apparent and more readily appreciated from the following description of exemplary embodiments, taken in conjunction with the accompanying drawings in which.

DETAILED DESCRIPTION

Figure 1A:
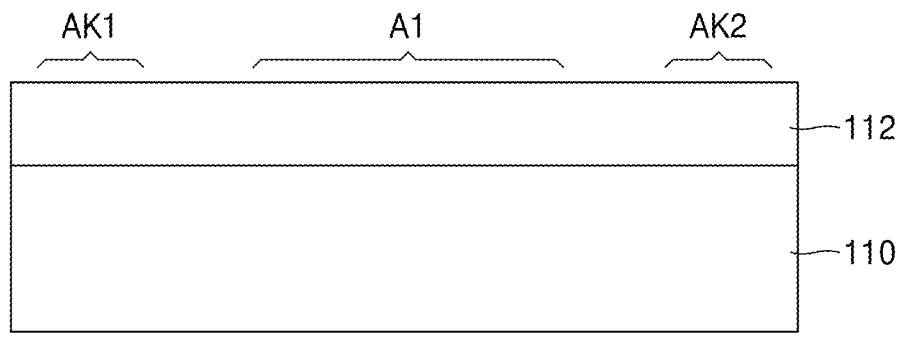
FIGS. 1A through 1D are cross-sectional views of a method of manufacturing a meta-surface optical device according to an exemplary embodiment.

A meta-surface may be used for any of various applications. However, an undesirable defect may occur as a result of an optical part that includes only a meta-structure.

Commonly, peripheral light is blocked by an optical part combining an aperture with a module.

In the case of a meta-surface optical part formed by using a semiconductor process and an integration technique, the assembling cost may be increased and precision may be reduced.

In particular, in the case of a structured optical pattern like a meta-surface optical part used in a depth sensor, it is important to reduce or remove light that is not used for forming the structured optical pattern, that is, zero-order light or zero-order noise.

Therefore, in the present exemplary embodiments, a meta-surface optical device including a structure for reducing a zero-order effect, that is, a structure for reducing the effect of zero-order light in a diffractive optical element and a method of manufacturing the meta-surface optical device are described. The method of manufacturing the meta-surface optical element according to the present exemplary embodiment includes (1) a method of using an optical absorption material and (2) a method of forming a multi-functional meta-surface.

Through combining the various methods described below, various manufacturing methods and meta-surface optical devices may be induced.

Meta-surface optical devices and methods of manufacturing the meta-surface optical devices will now be described in detail with reference to the accompanying drawings. In the drawings, thicknesses of layers and regions may be exaggerated for clarity of the specification.

Figure 1B:
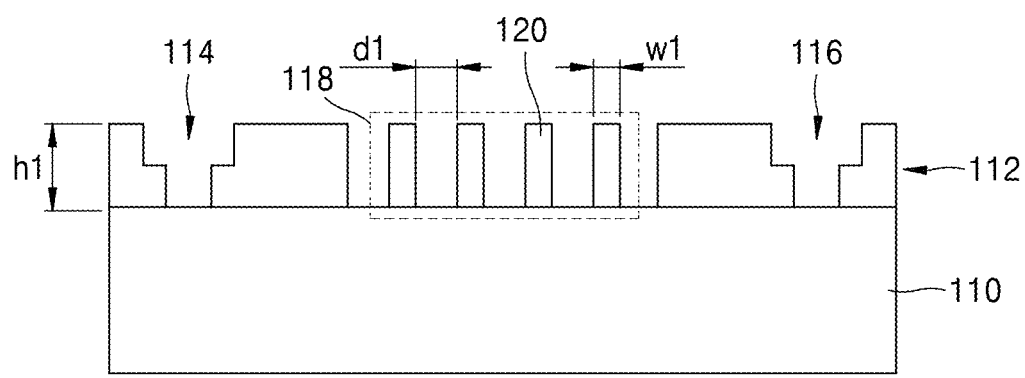
Figure 1C:
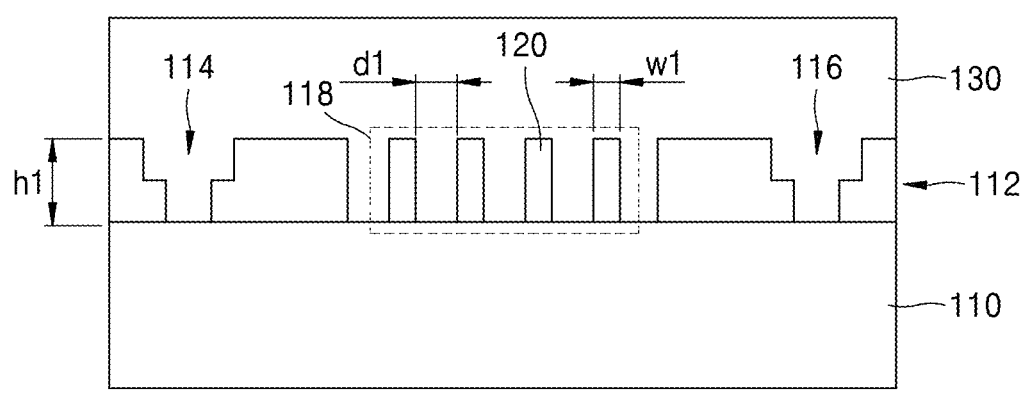
Figure 1D:
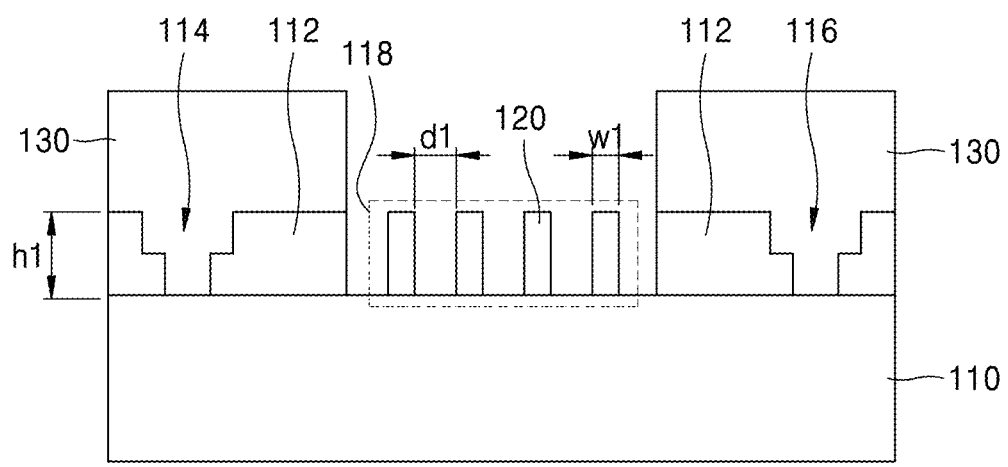

FIG. 1D is a cross-sectional view of a meta-surface optical device according to an exemplary embodiment.

Referring to FIG. 1D, a meta-surface 118 is formed on a region of a substrate 110. The substrate 110 may be a material layer that is transparent with respect to light. The meta-surface 118 includes a plurality of patterns 120 formed on the substrate 110. The patterns 120 are separated from each other by first gaps d1. The first gaps d1 by which the patterns 120 are separated may be constant or may vary. The patterns 120 may have various respective widths w1. The widths w1 of the patterns 120 may be equal to each other or may vary. The first gaps d1 between the patterns 120 and the widths w1 of the patterns 120 may be less than a wavelength of light incident on the meta-surface 118. A material layer (hereinafter, a meta-material layer) 112 used for forming the meta-surface 118 is formed on the substrate 110 on both sides of the meta-surface 118. The material forming the patterns 120 may be the same as the material of the meta-material layer 112. The meta-material layer 112 may be a transparent material layer, and may include any of various materials according to the light intended to be incident on the device. The meta-material layer 112 may be formed of any of various dielectric materials, for example, amorphous silicon a-Si, titanium oxide (for example, $TiO_2$), or silicon nitride (for example, $Si_3N_4$). The meta-material layer 112 formed on both sides of the meta-surface 118 may respectively include alignment key patterns 114 and 116. The alignment key patterns 114 and 116 may be symmetrical with respect to the meta-surface 118. The alignment key patterns 114 and 116 may be through holes passing through the meta-material layer 112. Metal patterns or embossed patterns may also be formed as alignment key patterns. The metal patterns or the embossed patterns may be formed along or together with the through holes. Portions of the substrate 110 are thus exposed through the alignment key patterns 114 and 116. The height and type of the alignment key patterns 114 and 116 may be the same as the height and type of alignment key patterns used in a related art semiconductor photolithography process. A light absorption layer 130 may be arranged on the meta-material layer 112. The light absorption layer 130 may cover the meta-material layer 112 to prevent light from being incident on the meta-material layer 112. The light absorption layer 130 may fill the through holes, to be the alignment key patterns 114 and 116, and may completely cover an upper surface of the meta-material layer 112 around the alignment key patterns 114 and 116. The light absorption layer 130 may be, for example, a photo-definable polymer layer.

Next, a method of manufacturing a meta-surface optical device according to an exemplary embodiment will now be described with reference to FIGS. 1A through 1D.

Referring to FIG. 1A, the meta-material layer 112 is formed on the substrate 110. The substrate 110 may be formed of a material that is transparent with respect to incident light. The meta-material layer 112 may be formed of the dielectric materials described above. A first region A1, in which the meta-surface 118 (refer to FIG. 1B) will be formed, and second and third regions AK1 and AK2, in which the alignment key patterns 114 and 116 will be formed, are defined on the meta-material layer 112. One of the second and third regions AK1 and AK2 may be on one side of the first region A1 and the other of the second and third regions AK1 and AK2 may be on the other side of the first region A1. The second and third regions AK1 and AK2 may be symmetrical with respect to the first region A1.

Referring to FIG. 1B, the meta-surface 118 including the patterns 120 is formed on the first region A1 in the meta-material layer 112. When the meta-surface 118 is formed, first and second alignment key patterns 114 and 116 respectively are also formed on the second and third regions AK1 and AK2 in the meta-material layer 112. The first and second alignment key patterns 114 and 116 may be formed for aligning a photomask in a subsequent patterning process of the meta-material layer 112. The meta-surface 118 and the first and second alignment key patterns 114 and 116 may be formed by using any of various nano-processes, such as photolithography, e-beam lithography, nano-imprint, soft-lithography, etc. dry etching, or deposition or a composite of these processes. The patterns 120 included in the meta-surface 118 may be formed to be separated from each other by the first gaps d1. The first gaps d1 between the patterns 120 may be constant, as shown, or may vary. Each of the patterns 120 may have provided widths w1. The widths w1 of the patterns 120 may be equal to each other, as shown, or may vary. The patterns 120 may have a provided height h1. The height h1 of the patterns 120 may be equal to each other, as shown, or may vary.

Next, as depicted in FIG. 1C, the light absorption layer 130 completely covering the meta-material layer 112 and the meta-surface 118 is formed on the substrate 110 and on the remaining portions of the meta-material. Thus, the light absorption layer 130 may also completely cover the first and second alignment key patterns 114 and 116. The surface of the light absorption layer 130 may be flat. Next, after a photomask M1 is formed on the light absorption layer 130 outside a region of the meta-surface 118, the light absorption layer 130 is removed from the meta-surface 118. As an example, after selectively exposing a region of the light absorption layer 130 corresponding to the meta-surface 118 by using a general selective photolithography process, only the light absorption layer 130 in the region of the meta-surface 118 may be removed by developing the exposed region of the light absorption layer 130. In this manner, as depicted in FIG. 1D, the meta-surface optical device is formed.

Since the light absorption layer 130 is formed on both sides of the meta-surface 118, light, for example, zero-order light incident on the regions outside the meta-surface 118 may be absorbed by the light absorption layer 130. Accordingly, a defect, for example, an image of the meta-surface 118 or a bright spot on a boundary of the meta-surface 118 due to zero-order light does not occur on an image region formed by light incident on through the meta-surface 118.

As a result, due to the light absorption layer 130 provided around the meta-surface 118, the quality of an image region, for example, a structured optical pattern formed by the meta-surface 118 may be increased. The light absorption layer 130 is only one example of a light control member, and as described below, there are various types of light control members.

Next, a meta-surface optical device according to another exemplary embodiment will now be described. In this case, a light control member is arranged on a rear side of a substrate.

Figure 2A:
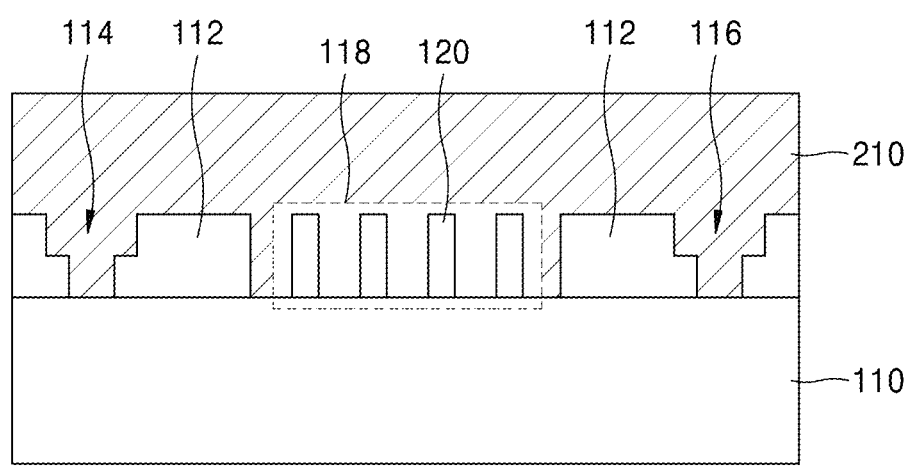
FIGS. 2A through 2C are cross-sectional views of a method of manufacturing a meta-surface optical device according to another exemplary embodiment.
Figure 2B:
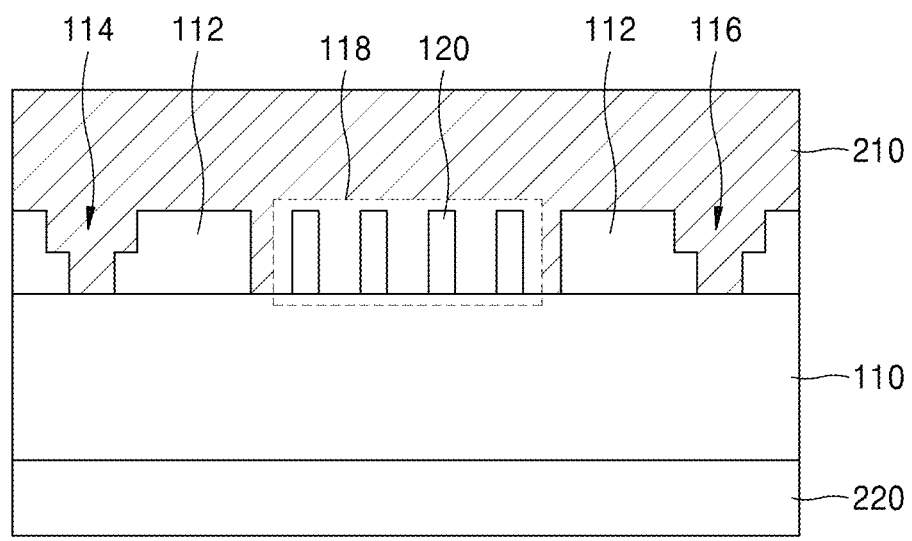
Figure 2C:
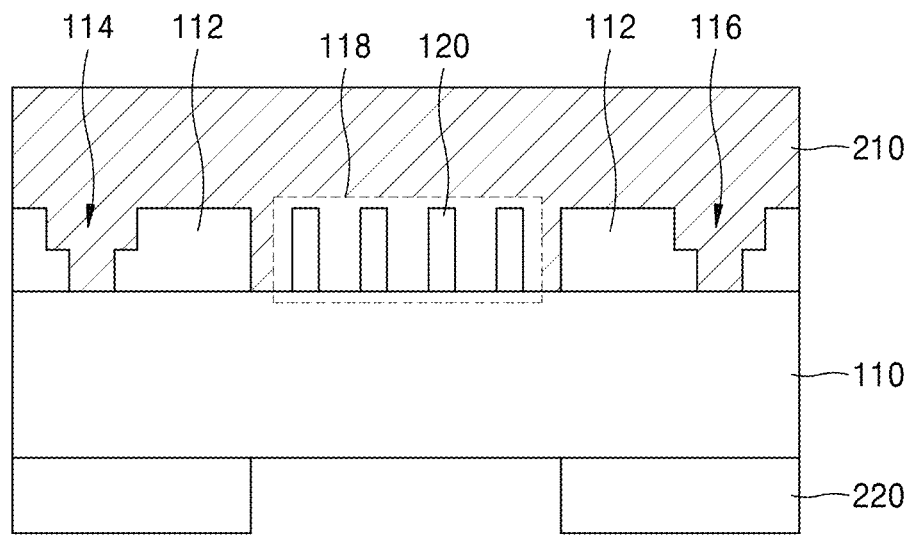

Referring to FIG. 2C, the meta-surface 118 and the alignment key patterns 114 and 116 are arranged on the substrate 110. The arrangement of the meta-surface 118 and the alignment key patterns 114 and 116 may be the same as that of FIG. 1D. A cladding layer 210 is formed on the substrate 110 and over the meta-surface 118 and the alignment key patterns 114 and 116. The cladding layer 210 fills through holes that are the alignment key patterns 114 and 116. The cladding layer 210 covers the meta-material layer 112 and the meta-surface 118. The cladding layer 210 may be a planarization layer. The cladding layer 210 may be, for example, a spin-on-glass (SOG) layer, an SiO2 layer or an Si3N4 layer and so on. A light absorption layer 220 is attached to a bottom surface of the substrate 110. The light absorption layer 220 may be the same material as the light absorption layer 130 of FIG. 1D. The light absorption layer 220 is arranged below the meta-material layer 112 and is not arranged below the meta-surface 118. Accordingly, light incident on the meta-material layer 112 outside a region of the meta-surface 118 is absorbed by the light absorption layer 220.

Next, a method of manufacturing the meta-surface optical device according to another exemplary embodiment will now be described with reference to FIGS. 2A through 2C.

Referring to FIG. 2A, the meta-surface 118 and the alignment key patterns 114 and 116 are formed on the substrate 110. The meta-surface 118 and the alignment key patterns 114 and 116 may be formed as the method described with reference to FIGS. 1A and 1B. Next, the cladding layer 210 covering the meta-surface 118, the alignment key patterns 114 and 116, and the meta-material layer 112 is formed on the substrate 110 and over the meta-surface 118 and the alignment key patterns 114 and 116. The cladding layer 210 may be, for example, an SOG layer. After forming the cladding layer 210, a surface of the cladding layer 210 is flattened.

Next, as depicted in FIG. 2B, the light absorption layer 220, completely covering a bottom surface of the substrate 110, is formed. The light absorption layer 220 may be a photo-definable polymer layer. Next, the light absorption layer 220 below the meta-surface 118 is removed by patterning the light absorption layer 220. The patterning of the light absorption layer 220 may be performed by using any of various nano-processes, such as photolithography, e-beam lithography, nano-imprint, soft-lithography, etc. dry etching, or deposition or a composite of these processes.

In this way, as depicted in FIG. 2C, the meta-surface optical device may be formed, in which the portions of the bottom surface of the substrate 110 adjacent to the portion opposite the meta-surface 118 are covered by the light absorption layer 220.

Figure 3A:
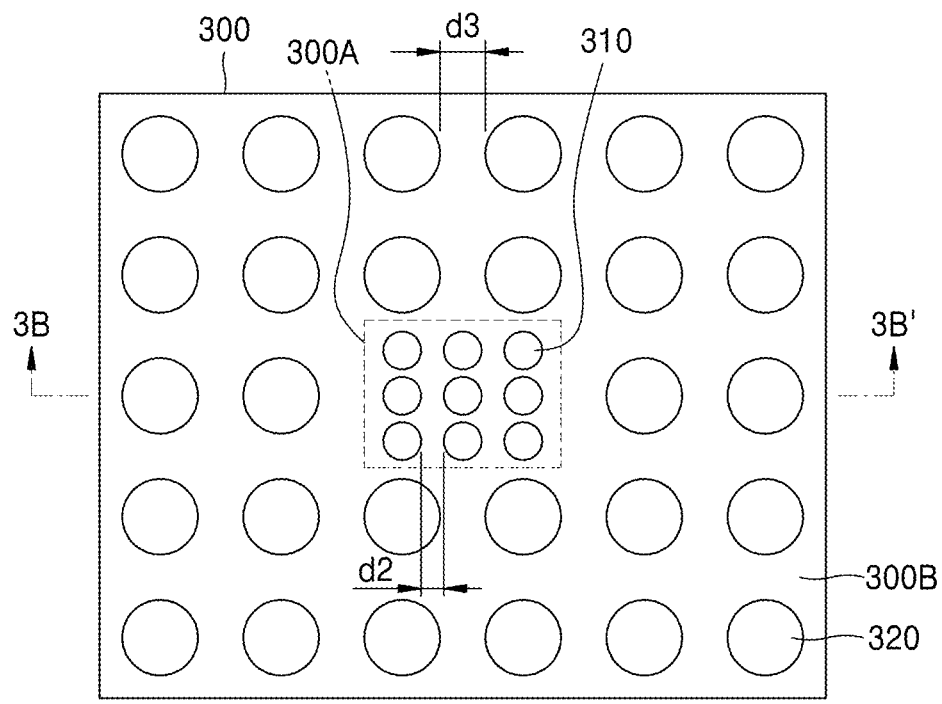
FIG. 3A is a plan view of a meta-surface optical device according to another exemplary embodiment.

FIG. 3A is a plan view of a meta-surface optical device according to another exemplary embodiment.

Referring to FIG. 3A, the meta-surface optical device includes a first region 300A in which a meta-surface is formed and a second region 300B surrounding the first region 300A. The second region 300B performs an operation different from that of the first region 300A with respect to incident light. The first region 300A includes a plurality of patterns 310 that perform a specific operation with respect to incident light. For example, the specific operation may be an operation of refracting or diffracting the incident light. Also, the second region 300B includes a plurality of patterns 320. The patterns 320 in the second region 300B may be light control members that effect the progress of light or change the progress direction of light, and perform an operation different from the operation of the patterns 310 formed in the first region 300A with respect to incident light. The patterns 310 in the first region 300A constitute a meta-surface. The patterns 310 are separated from each other by second gaps d2. The second gaps d2 may have a size less than a wavelength of light incident onto the first region 300A. The patterns 320 in the second region 300B are separated from each other by third gaps d3. The third gaps d3 may be larger or smaller than the second gaps d2. The patterns 320 in the second region 300B may be provided to cause an operation, for example, absorption, reflection, or high refraction, different from that of the meta-surface with respect to incident light. Here, the phrase "high refraction" denotes a refraction of light incident onto the second region 300B so that the light incident on the second region 300B deviates from an image region formed by the meta-surface in the first region 300A. One of the absorption, reflection, and high refraction may be referred to as a first operation with respect to incident light, while another of the absorption, reflection, and high refraction may be a second operation, and yet another of the absorption, reflection, and high refraction may be a third operation.

Figure 3B:
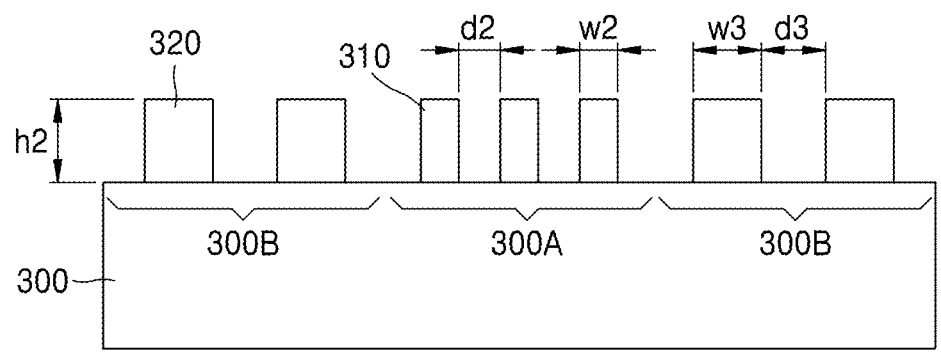
FIG. 3B is a cross-sectional view taken along line 3B-3B' of FIG. 3A.

FIG. 3B is a cross-sectional view taken along a line 3B-3B' of FIG. 3A.

Referring to FIG. 3B, patterns, that is, meta-surface patterns 310, are formed in a first region 300A of a transparent substrate 300 and a plurality of patterns 320 are formed in a second region 300B of a transparent substrate 300. Third gaps d3 and widths w3 of the patterns 320 in the second region 300B may be greater or less than second gaps d2 and widths w2 of the patterns 310 in the first region 300A. A height h2 of the patterns 310 in the first region 300A may be equal to that of the patterns 320 in the second region 300B.

Figure 3C:
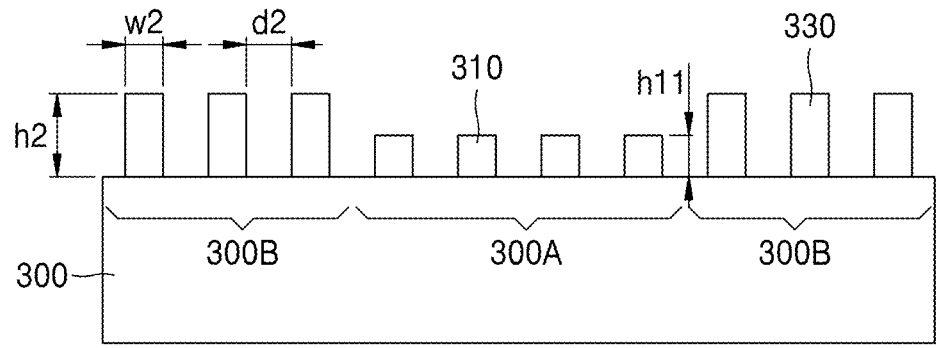
FIGS. 3C and 3D are cross-sectional views of modifications of the meta-surface optical device of FIG. 3B.
Figure 3D:
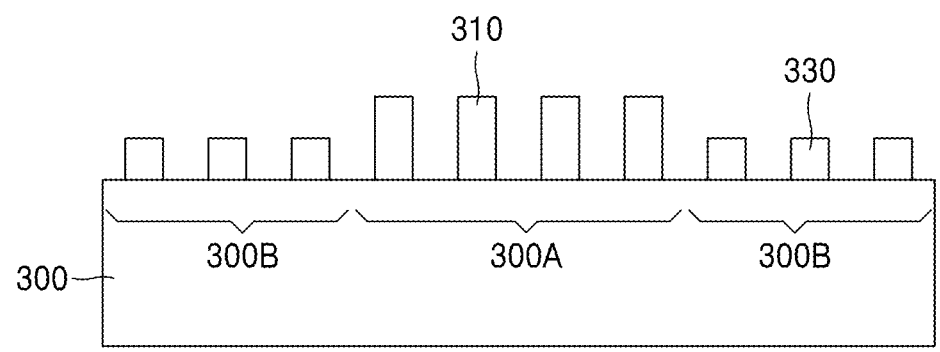

According to another exemplary embodiment, as depicted in FIG. 3C, patterns 310 may be arranged in the first region 300A of FIG. 3C, and patterns 330, having gaps d2 and widths w2 of the first patterns 310 of FIG. 3B, may be arranged in the second region 300B of FIG. 3C. However, as shown in FIG. 3C, the heights of the meta-surface patterns 310 in the first region 300A and of the patterns 320 in the second region 300B may be different from each other. For example, a height h11 of the meta-surface patterns 310 in the first region 300A may be less than a height h2 of the patterns 330 in the second region 300B. FIG. 3D shows a case opposite to the case of FIG. 3C. That is, the meta-surface patterns 310 in the first region 300A have a height greater than that of the patterns 320 in the second region 300B.

Figure 3E:
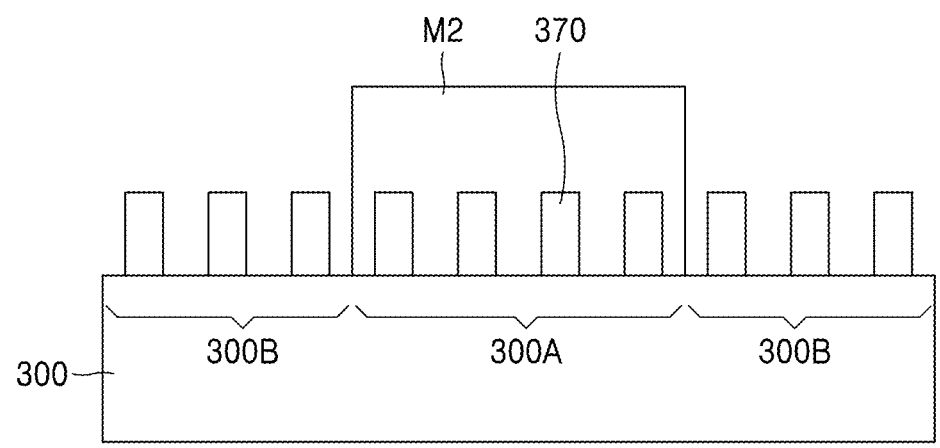
FIG. 3E is a cross-sectional view for explaining an exemplary manufacturing process for obtaining the results of FIGS. 3C and 3D.

The results of FIG. 3C or FIG. 3D may be obtained by forming patterns 370 having the same height over a whole surface of the transparent substrate 300, as shown in FIG. 3E, and by subsequently selectively etching the patterns 370 in an unselected region in a state in which a selected region, for example, the first region 300A, is protected by a mask M2. Accordingly, the height of the patterns 370 in the unselected region may be controlled by controlling an etching time.

Alternately, the meta-surface patterns 310 having different heights from each other may be formed by selectively etching a meta-surface material layer after forming the meta-surface material layer on the transparent substrate 300; or, the meta-surface patterns 310 having different heights may be formed by processing meta-surface material layers having different heights through any of various processes, as would be understood by one of skill in the art.

Figure 4A:
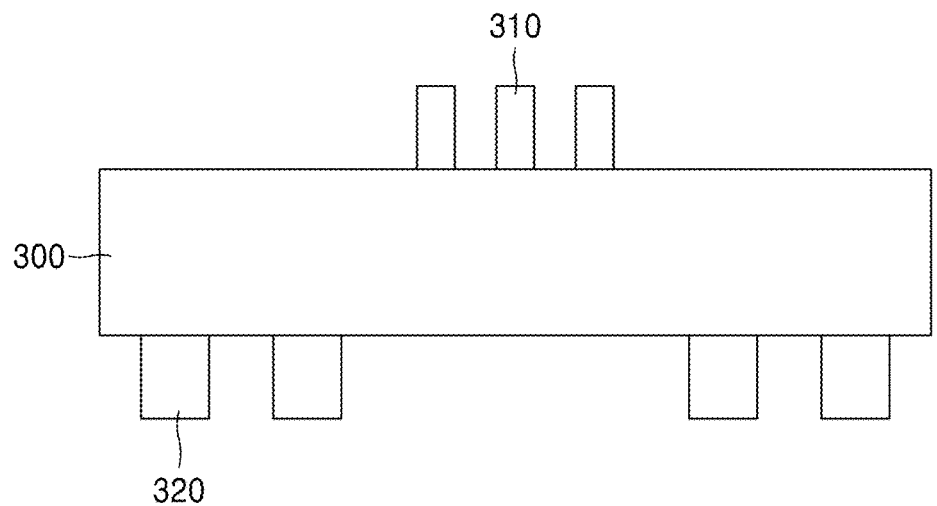
FIGS. 4A through 4C are cross-sectional views of a meta-surface optical device according to another exemplary embodiment.
Figure 4B:
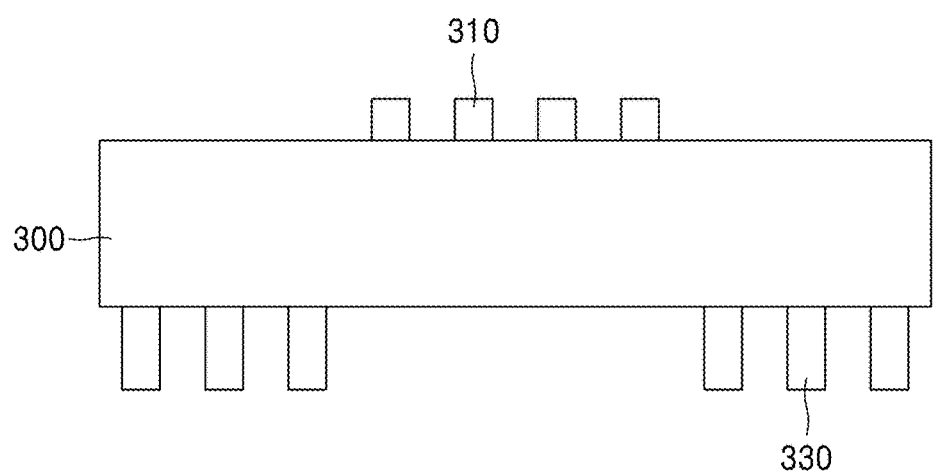
Figure 4C:
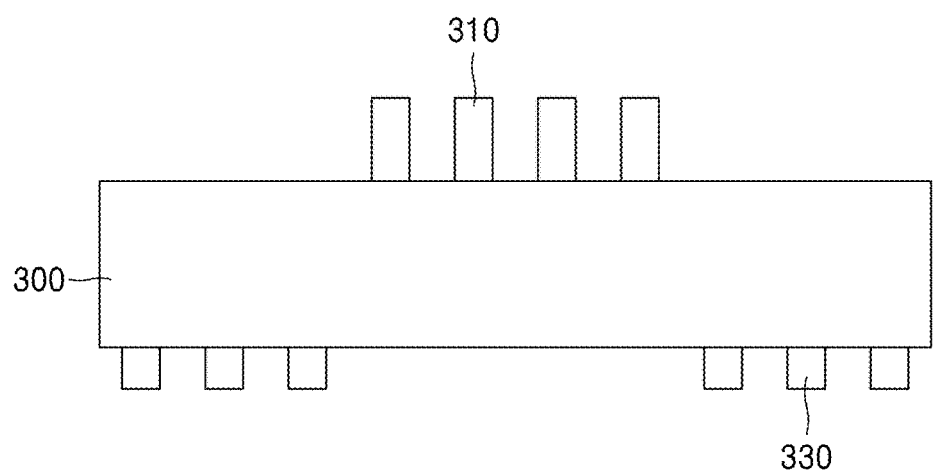

As depicted in FIG. 4A, the patterns 320, similar to those of FIG. 3B, may be arranged in the second region 300B on a bottom surface of the transparent substrate 300. As depicted in FIG. 4B, the patterns 330, similar to those of FIG. 3C, may be arranged in the second region 300B, on the bottom surface of the transparent substrate 300. As depicted in FIG. 4C, the patterns 330, similar to those of FIG. 3D, may be arranged in the second region 300B on the bottom surface of the transparent substrate 300.

FIGS. 5 through 13 are cross-sectional views respectively showing operations of meta-surfaces and light control members formed around the meta-surfaces with respect to incident light. The meta-surfaces may be the meta-surface patterns 310 formed in the first region 300A as described with respect to any of reference to FIGS. 3 and 4, and the light control members may be the patterns 320 formed in the second region 300B, as described with respect to any of FIGS. 3 and 4.

In FIGS. 5 through 13, for convenience, the meta-surfaces including a plurality of patterns formed on the transparent substrate 300 are depicted as a single material layer, and also, the light control members are depicted as a single material layer.

Figure 5:
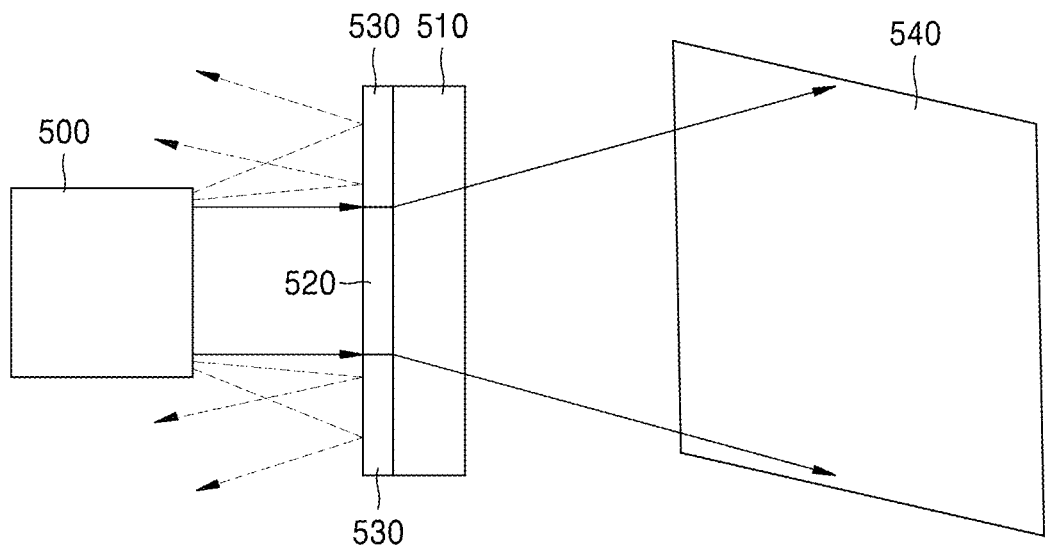
FIGS. 5 through 13 are cross-sectional views respectively showing operations of meta-surfaces and light control members formed around the meta-surfaces with respect to incident light, according to exemplary embodiments.

FIG. 5 shows a case in which both a meta-surface 520 and a light control member 530 are arranged on a surface of a substrate 510 facing a light source 500, and the light control member 530 includes patterns configured to reflect incident light.

Referring to FIG. 5, of light emitted from the light source 500, light (illustrated with solid lines) that is sequentially transmitted through the meta-surface 520 and the substrate 510 forms an image 540 in a region separated from the substrate 510. The image 540 may be a structured optical pattern. Of the light emitted from the light source 500, light (illustrated with dashed lines) incident on the light control member 530 around the meta-surface 520 is reflected by the light control member 530.

Figure 6:
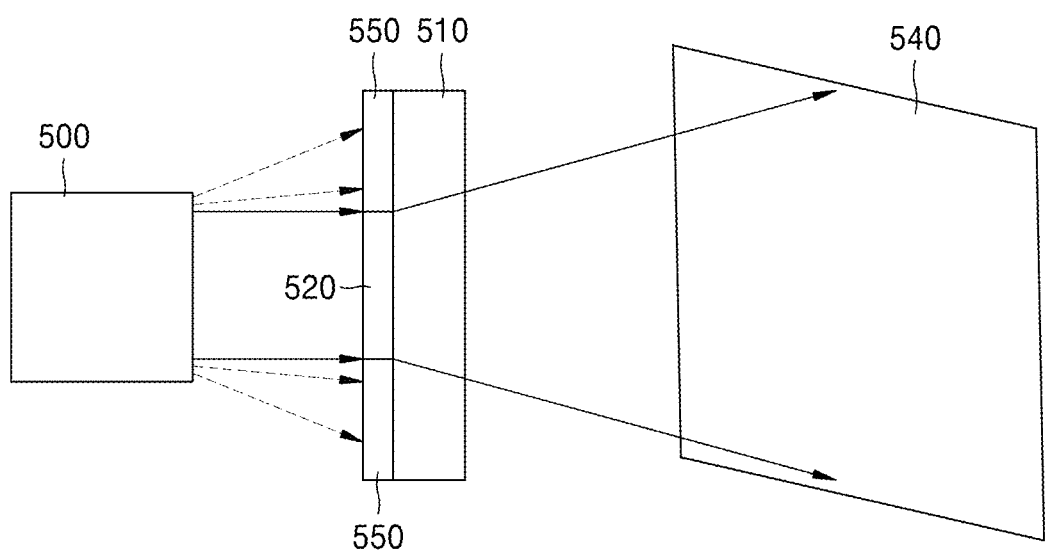

FIG. 6 shows a case in which both of a meta-surface 520 and a light control member 550 are arranged on a surface of a substrate 510 facing a light source 500, and the light control member 550 includes a plurality of patterns configured to absorb incident light.

Referring to FIG. 6, of light emitted from the light source 500, light (illustrated with solid lines) that is sequentially transmitted through the meta-surface 520 and the substrate 510 forms an image 540 in a region separated from the substrate 510. Of the light emitted from the light source 500, light (illustrated with dashed lines) incident on the light control member 550 around the meta-surface 520 is absorbed by the light control member 550.

Figure 7:
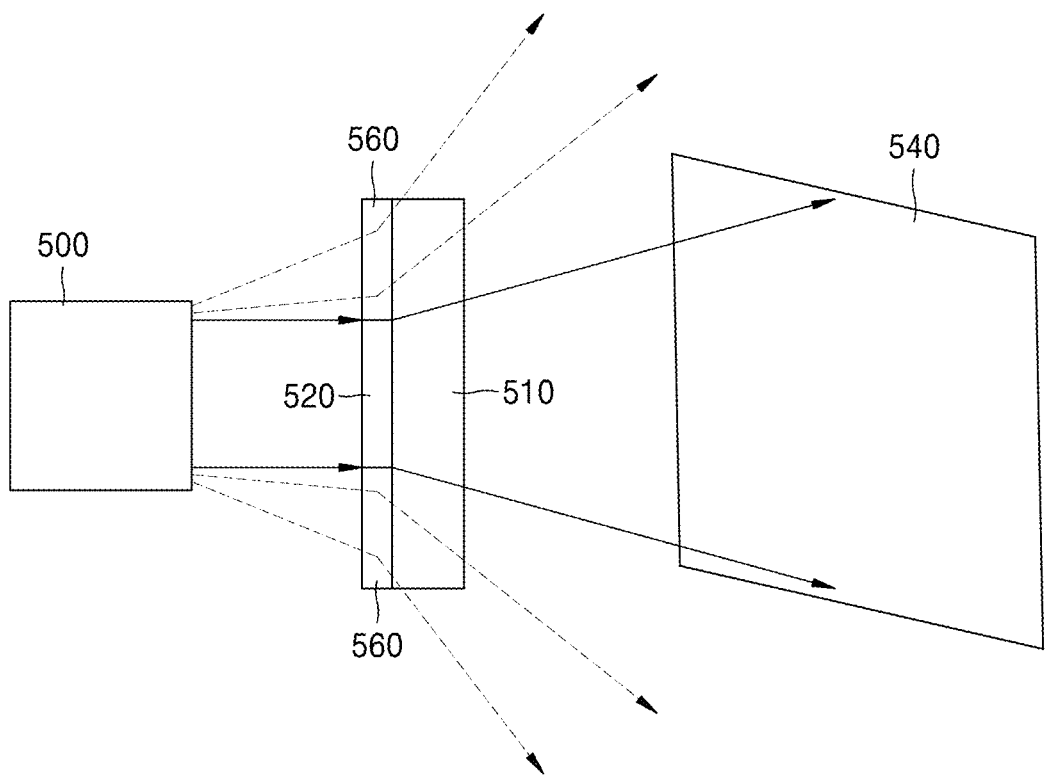

FIG. 7 shows a case in which both of a meta-surface 520 and a light control member 560 are arranged on a surface of a substrate 510 facing a light source 500, and the light control member 560 includes a plurality of patterns configured to refract incident light away from a region in which an image 540 is formed.

Referring to FIG. 7, the operation of the meta-surface 520 is the same as that of the meta-surface 520 of FIG. 5. Of light emitted from the light source 500, light (illustrated with dashed lines) incident on the light control member 560 around the meta-surface 520 is refracted away from the region in which the image 540 is formed by the light transmitted by meta-surface 520.

Figure 8:
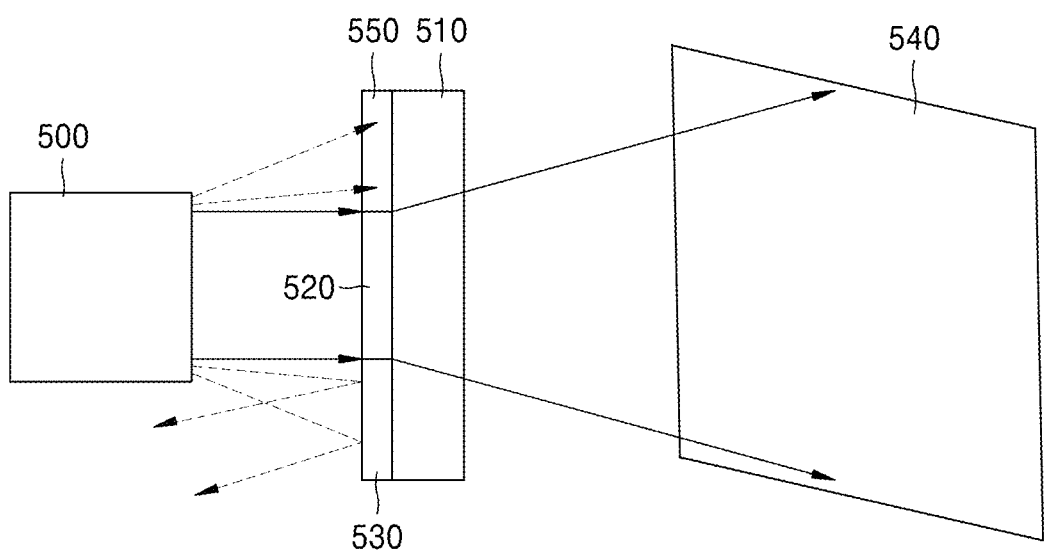

FIG. 8 shows a case in which both a meta-surface 520 and first and second light control members 530 and 550 different from each other are arranged on a surface of the substrate 510 facing the light source 500. According to this exemplary embodiment, the first and second light control members 530 and 550 include patterns configured to perform operations different from those of the meta surface 520 with respect to incident light.

Referring to FIG. 8, the operation of the meta-surface 520 is the same as that of the meta-surface 520 of FIG. 5. Of light emitted from the light source 500, light (illustrated with dashed lines) incident on the first light control member 530 around the meta-surface 520 is reflected and light (also illustrated with dashed lines) incident on the second light control member 550 is absorbed by the second light control member 550.

Figure 9:
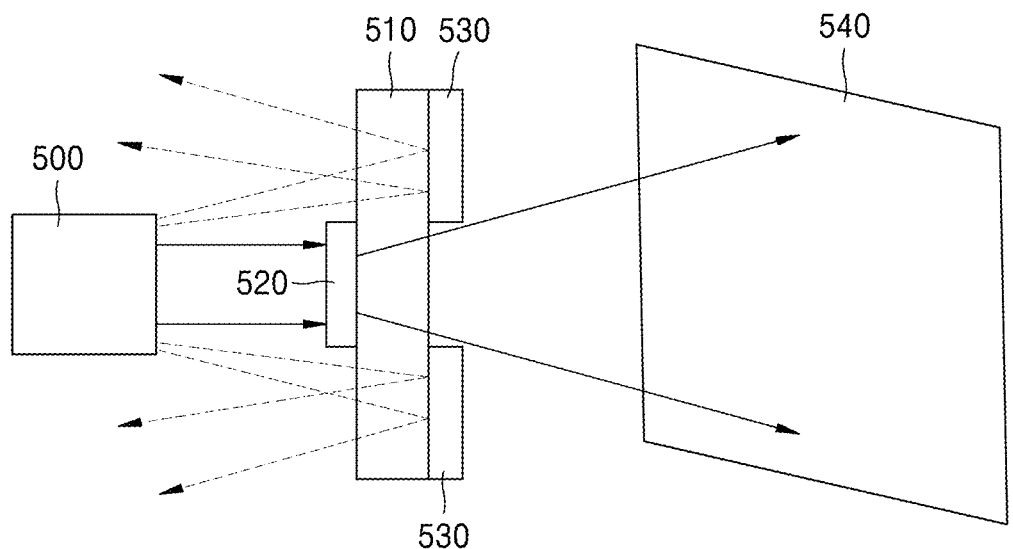

FIG. 9 shows a case in which a meta-surface 520 and a light control member 530 respectively are arranged on opposite surfaces of a substrate 510, and the light control member 530 includes patterns configured to reflect incident light.

Referring to FIG. 9, the meta-surface 520 is arranged on a surface (hereinafter, a first surface) of the substrate 510 facing the light source 500. The light control member 530 is arranged on a surface (hereinafter, a second surface) of the substrate 510 opposite the first surface.

Of light emitted from the light source 500, light (illustrated with solid lines) that is sequentially transmitted through the meta-surface 520 and the substrate 510 forms an image 540 in a region separated from the substrate 510. Of the light emitted from the light source 500, light (illustrated with dashed lines) incident on the light control member 530 around the meta-surface 520 is reflected by the light control member 530, back towards the light source 500 after being transmitted through the substrate 510.

Figure 10:
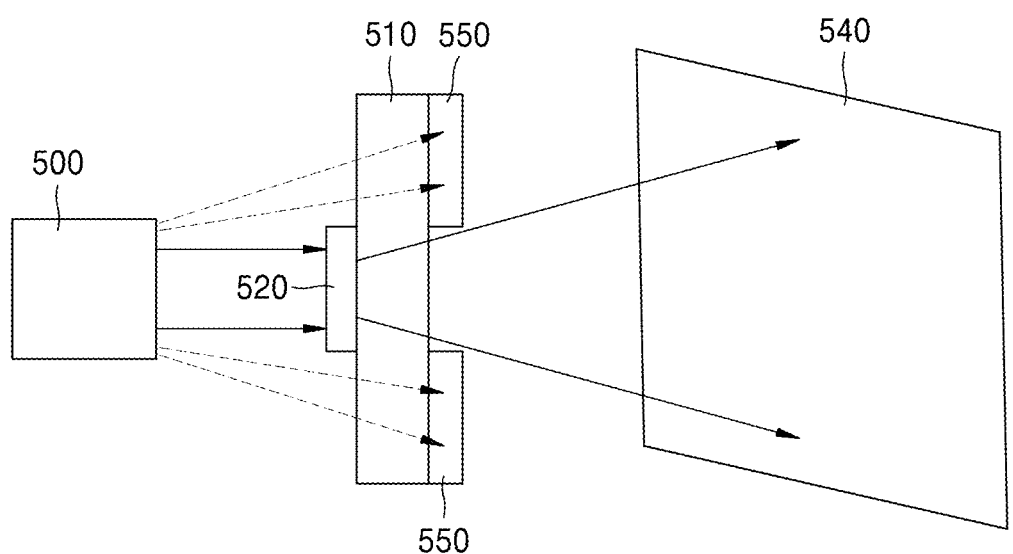

FIG. 10 shows a case in which a meta-surface 520 and a light control member 550 are arranged on different surfaces of the substrate 510, and the light control member 550 includes patterns configured to absorb incident light.

Referring to FIG. 10, the meta-surface 520 is arranged on the first surface of the substrate 510 and the light control member 550 is arranged on the second surface of the substrate 510. The arrangement location of the light control member 550 is the same as that shown in FIG. 9.

Of light emitted from the light source 500, the operation of light (illustrated with solid lines) that has passed through the meta-surface 520 is the same as the operation of the light incident on the meta-surface 520 of FIG. 9. Of the light emitted from the light source 500, light (illustrated with dashed lines) incident on the light control member 550 is absorbed by the light control member 550 after being transmitted through the substrate 510.

Figure 11:
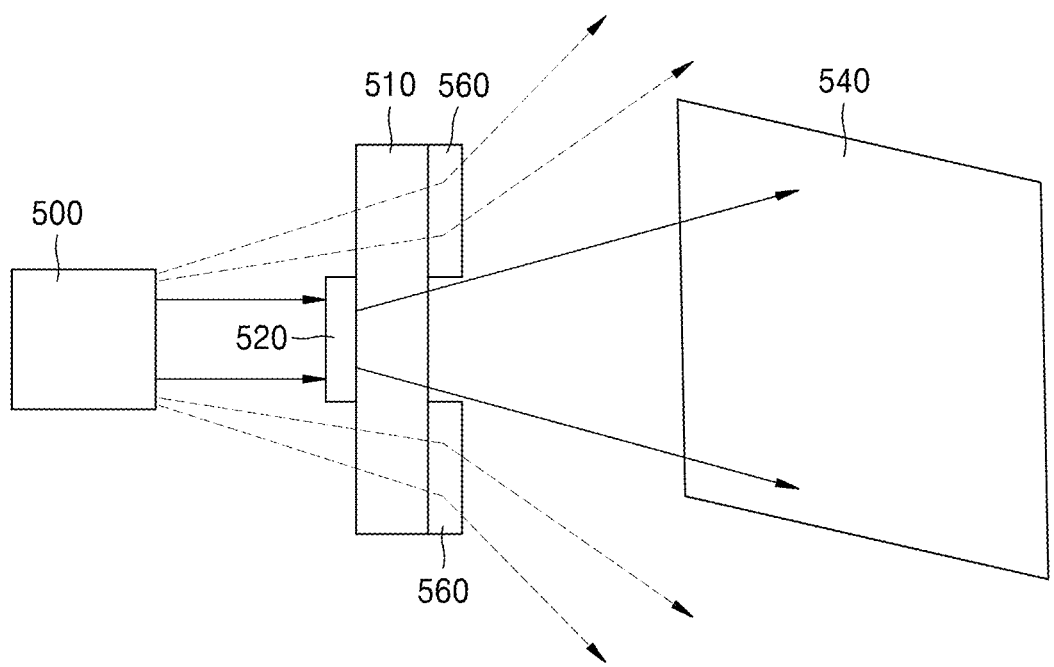

FIG. 11 shows a case in which a meta-surface 520 and a light control member 560 respectively are arranged on different surfaces of the substrate 510, and the light control member 560 includes patterns configured to refract incident light away from the region in which the image 540 is formed.

Referring to FIG. 11, the meta-surface 520 is arranged on the first surface of the substrate 510. The light control member 560 is arranged on the second surface of the substrate 510. The arrangement location of the light control member 560 may be the same as that shown in FIG. 9.

Of light emitted from the light source 500, an operation of light (illustrated with solid lines) that has been transmitted through the meta-surface 520 is the same as the operation of the light transmitted through the meta-surface 520 of FIG. 9. Of the light emitted from the light source 500, light (illustrated with dashed lines) incident on the light control member 560, after being transmitted through the substrate 510, is refracted away from the image 540.

Figure 12:
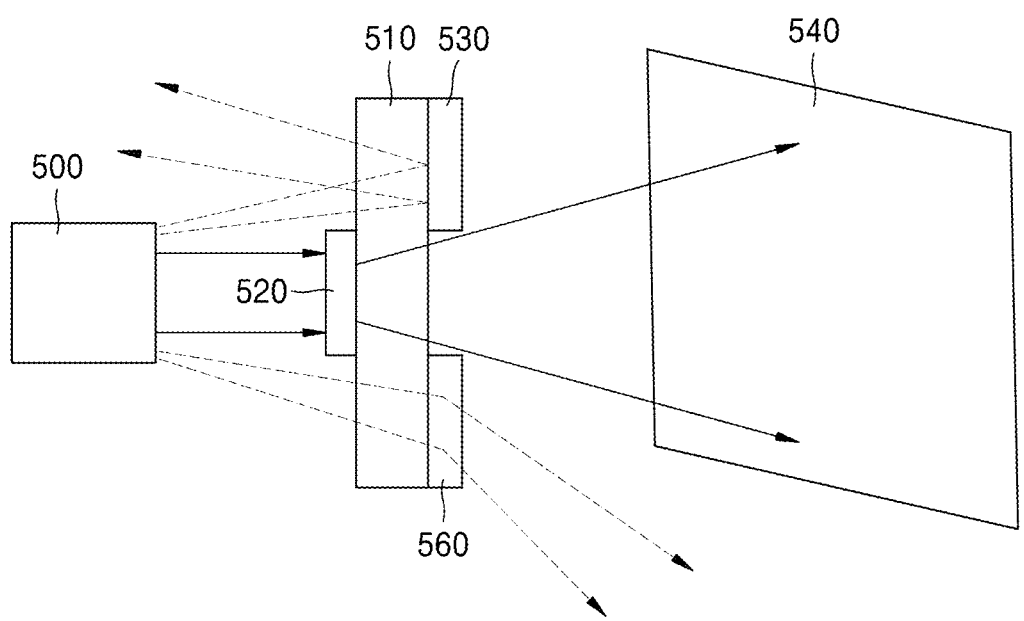

FIG. 12 shows a case in which a meta-surface 520 is arranged on the first surface of the substrate 510 and first and second light control members 530 and 560, which perform operations different from each other with respect to incident light, are arranged on the second surface of the substrate 510, and the first and second light control members 530 and 560 include patterns configured to respectively reflect light and to refract light away from the image 540.

Referring to FIG. 12, the locations of arrangements of the light control members 530 and 560 may be the same as the locations of the light control members 530, 550, and 560 as shown in FIGS. 9 through 11.

The operation of light (illustrated with solid lines) that is transmitted through the meta-surface 520 is the same as the light incident on the meta-surface 520 of FIG. 9. Of the light emitted from the light source 500, light (illustrated with dashed lines) incident on the light control member 530 is reflected therefrom after being transmitted through the substrate 510. Of light emitted from the light source 500, light (also illustrated with dashed lines) incident on the light control member 560 is refracted away from the image 540.

Figure 13:
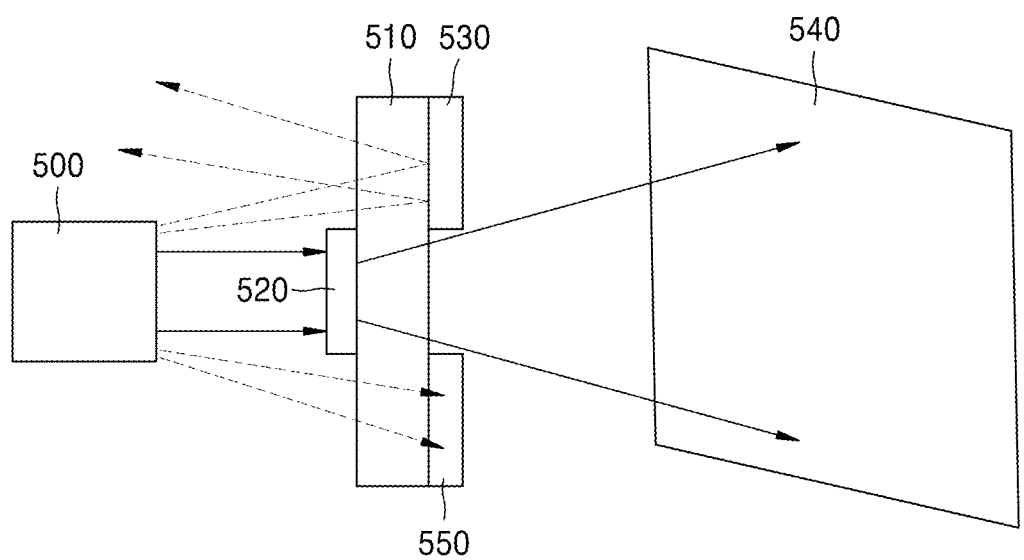

FIG. 13 shows a case in which a meta-surface 520 is arranged on the first surface of the substrate 510 and light control members 530 and 550, that perform operations different from each other with respect to incident light are arranged on the second surface of the substrate 510, and the light control members 530 and 550 include patterns configured to respectively reflect and absorb incident light.

Referring to FIG. 13, arrangement locations of the light control members 530 and 550 are the same as the locations of the light control members 530 and 560 of FIG. 12.

An operation of the light (illustrated with solid lines) that has been transmitted through the meta-surface 520 is the same as the light incident on the meta-surface 520 of FIG. 9. Of light emitted from the light source 500, light (illustrated with dashed lines) incident on the light control member 530 is reflected after being transmitted through the substrate 510. Of the light emitted from the light source 500, light (also illustrated with dashed lines) incident on the light control member 550 is absorbed by the light control member 550.

Figure 14:
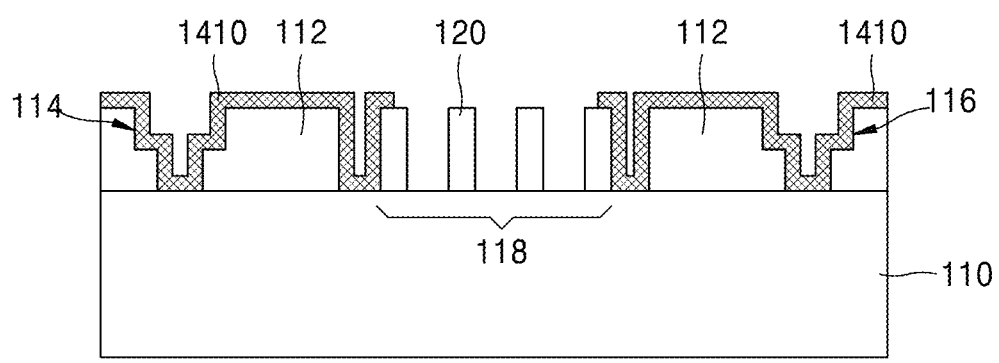
FIG. 14 is a cross-sectional view of a meta-surface optical device according to another exemplary embodiment.

FIG. 14 is a cross-sectional view of a meta-surface optical device according to another exemplary embodiment.

Like reference numerals are used to indicate elements that are identical to the elements described above.

Referring to FIG. 14, the meta-surface patterns 120, the meta-material layer 112, and the alignment key patterns 114 and 116 that are described with reference to FIG. 1B are arranged on the substrate 110. The meta-material layer 112, disposed around the meta-surface 118, and the alignment key patterns 114 and 116 are covered by a metal film 1410. The through holes, that is, the alignment key patterns 114 and 116 are also covered by the metal film 1410. That is, all regions on the substrate 110 except for the region of the meta-surface 118 are covered by the metal film 1410. The metal film 1410 may be a light control member that reflects incident light. Accordingly, all light incident on regions around the meta-surface 118 may be reflected by the metal film 1410. The metal film 1410 may be, for example, an Au film.

FIGS. 15A through 15D are cross-sectional views of a method of manufacturing the meta-surface optical device of FIG. 14.

Figure 15A:
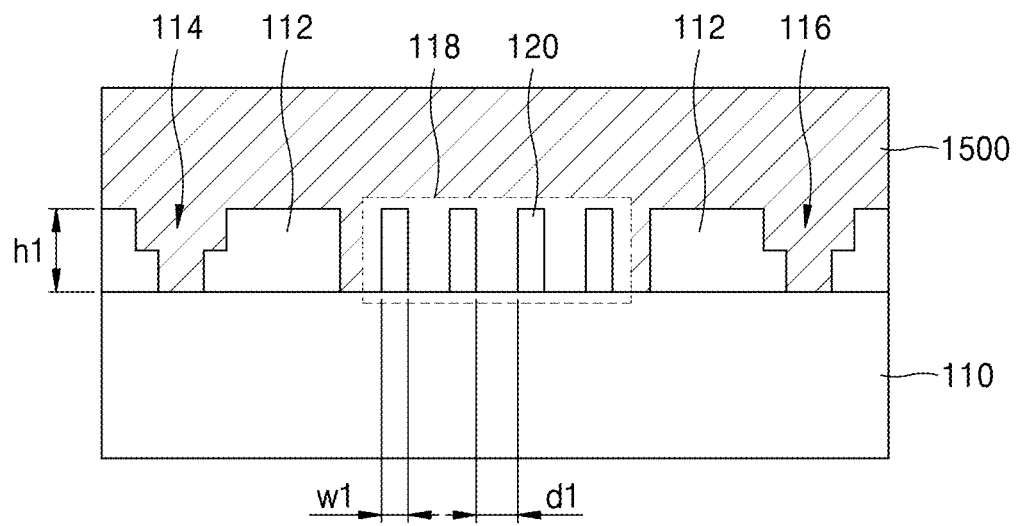
FIGS. 15A through 15D are cross-sectional views of an exemplary method of manufacturing the meta-surface optical device of FIG. 14.
Figure 15B:
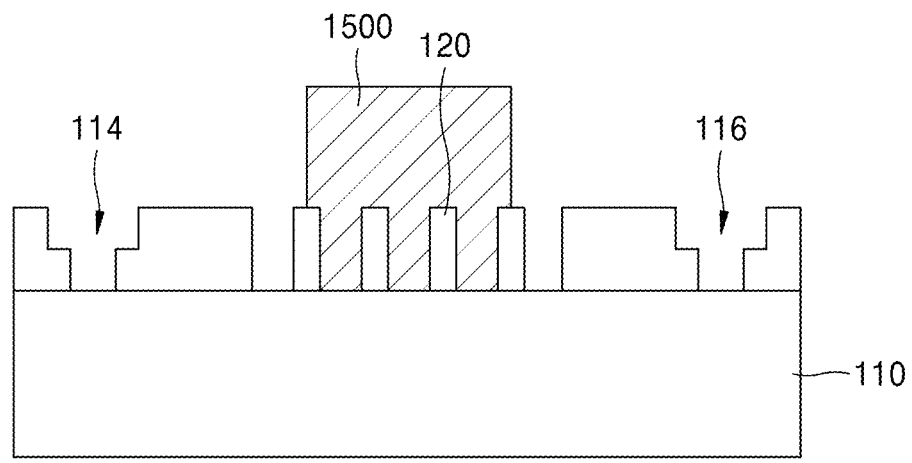

Referring to FIG. 15A, as described with reference to FIG. 1B, the meta-surface 118 and the alignment key patterns 114 and 116 are formed in the meta-material layer 112 on the substrate 110. Next, a mask layer 1500 covering the meta-material layer 112, the meta-surface 118, the alignment key patterns 114 and 116, and exposed portions of the substrate 110 is formed on the substrate 110. The mask layer 1500 may be a photosensitive film. As shown in FIG. 15B, after exposing a portion of the mask layer 1500 by using a photolithography process, the mask layer 1500 is removed except for the portion covering the meta-surface 118.

Figure 15C:
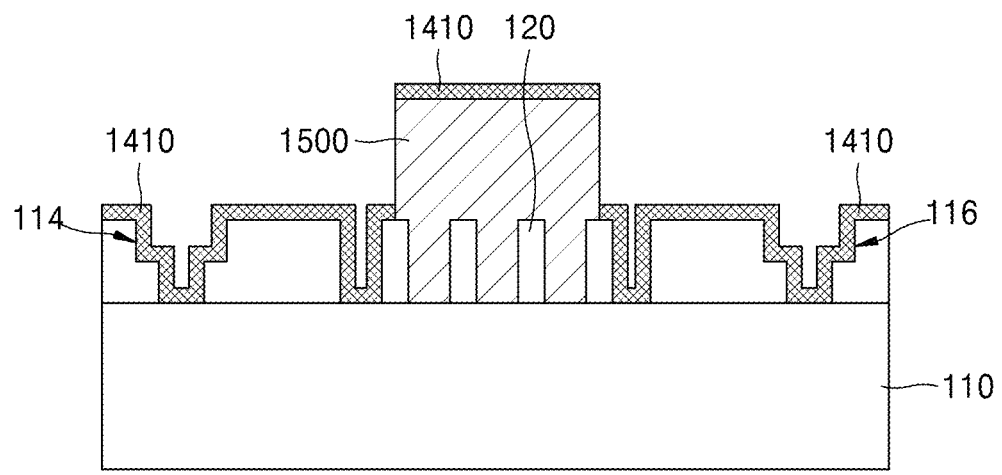

Next, as depicted in FIG. 15C, the metal film 1410 is formed to cover completely the upper surface of the mask layer 1500, the meta-material layer 112, the alignment key patterns 114 and 116, and exposed regions of the substrate 110. Accordingly, all regions around the mask layer 1500 including the upper surface of the remaining portion of the mask layer 1500 are covered by the metal film 1410. Afterwards, the mask layer 1500 is removed by using a lift-off process. At this point, the metal film 1410 formed on the mask layer 1500 is also removed. The mask layer 1500 may be removed by using, for example, an ashing process.

Figure 15D:
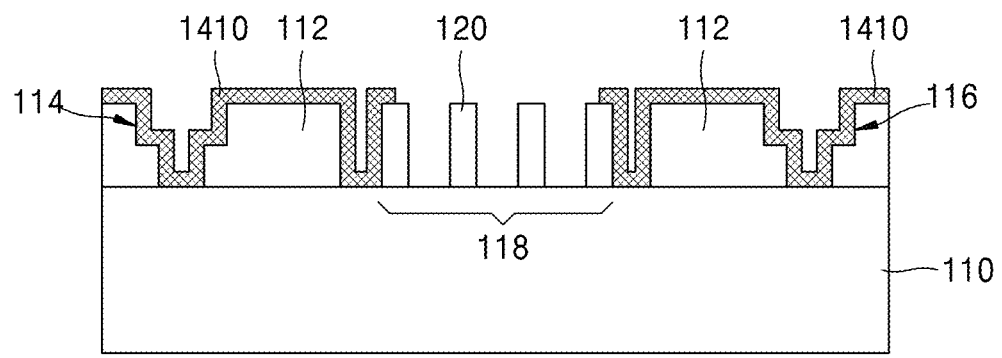

In this way, as depicted in FIG. 15D, a meta-surface optical device in which the metal film 1410 as a light control member is formed around the meta-surface 118 is formed.

Figure 16:
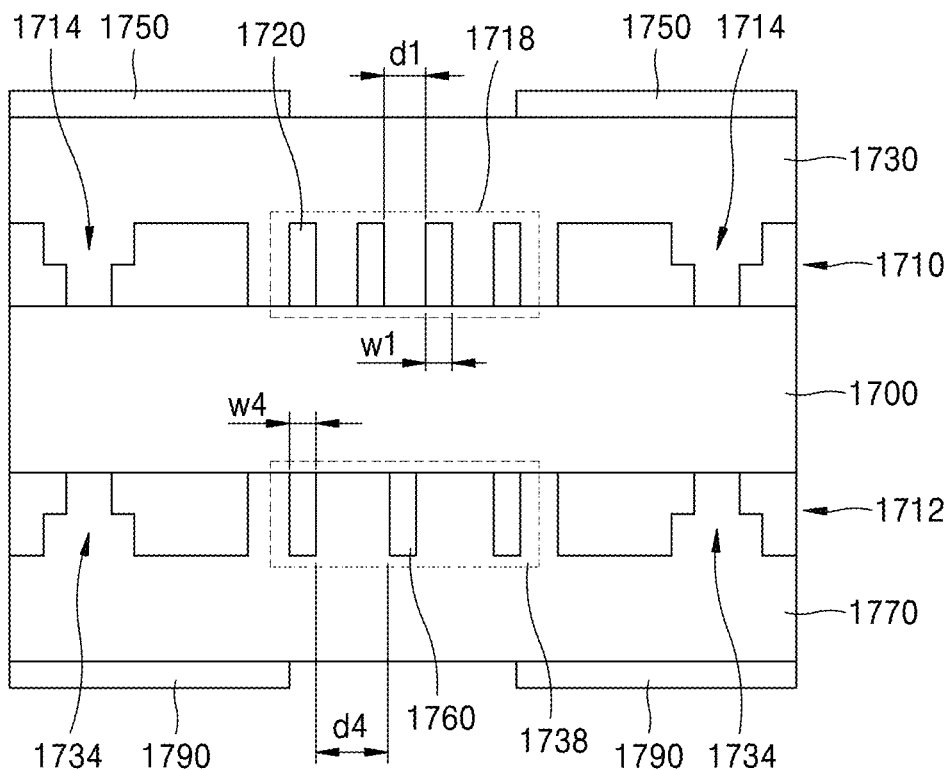
FIG. 16 is a cross-sectional view of a meta-surface optical device according to another exemplary embodiment.

FIG. 16 is a cross-sectional view of a meta-surface optical device according to another exemplary embodiment.

FIG. 16 shows a case in which meta-surfaces are respectively formed on both surfaces of a transparent substrate 1700.

Referring to FIG. 16, a first meta-material layer 1710 is arranged on an upper surface of the substrate 1700. The first meta-material layer 1710 includes a first meta-surface 1718 and first alignment key patterns 1714. The first meta-surface 1718 includes a plurality of patterns 1720. The substrate 1700 is exposed through gaps between the patterns 1720. The patterns 1720 are separated by first gaps d1. Each of the patterns 1720 has a width w1 and a height h1. The first gaps d1 and the width w1 are less than a wavelength of incident light. A first cladding layer 1730 is formed to cover the first meta-surface 1718, the first alignment key patterns 1714, and exposed portions of the substrate 1700. A surface of the first cladding layer 1730 is flat. The first cladding layer 1730 may be, for example, a spin-on-glass (SOG) layer. A first light blocking layer 1750 is arranged on the first cladding layer 1730. The first light blocking layer 1750 may completely cover an upper surface of the first cladding layer 1730 except for a portion of the first cladding layer 1730 corresponding to the first meta-surface 1718. The first light blocking layer 1750 may be a light absorption layer or a light reflection layer. The first light blocking layer 1750 may be a metal layer or a polymer layer.

A second meta-material layer 1712 is attached to a bottom surface of the transparent substrate 1700. The second meta-material layer 1712 includes a second meta-surface 1738 and second alignment key patterns 1734. The second alignment key patterns 1734 are formed by one and one on both sides of the second meta-surface 1738. The second alignment key patterns 1734 may be vertically symmetrical, about the transparent substrate 1700, with respect to the first alignment key patterns 1714. The first meta-surface 1738 includes a plurality of patterns 1760. The patterns 1760 are separated by fourth gaps d4, and each has a width w4. The fourth gaps d4 and the width w4 of the patterns 1760 that constitute the second meta-surface 1738 are less than a wavelength of incident light. The fourth gaps d4 and the width w4 of the patterns 1760 that constitute the second meta-surface 1738 may be different from the first gaps d1 and the width w1 of the patterns 1720 that constitute the first meta-surface 1718. The fourth gaps d4 and the width w4 of the patterns 1760 that respectively constitute the second meta-surface 1738 may be greater than the first gaps d1 and the width w1 of the patterns 1720 that constitute the first meta-surface 1718. The first meta-surface 1718 and the second meta-surface 1738 may be operated, respectively, as different optical elements from each other with respect to incident light. For example, the first meta-surface 1718 may act as a first refractive optical element and the second meta-surface 1738 may act as a second refractive optical element. For example, the first and second refractive optical elements may be a lens.

Next, a second cladding layer 1770 is formed, covering the second meta-surface 1738 and the second alignment key patterns 1734, below the second meta-material layer 1712. The second cladding layer 1770 may include the same material as the first cladding layer 1730. A bottom surface of the second cladding layer 1770 is flat. A second light blocking layer 1790 is attached to the bottom surface of the second cladding layer 1770. The second light blocking layer 1790 covers the whole bottom surface of the second cladding layer 1770 except for a portion of the second cladding layer 1770 corresponding to the second meta-surface 1738. The second light blocking layer 1790 may be a light absorption layer or a light reflection layer.

FIGS. 17A through 17I are cross-sectional views of a method of manufacturing the meta-surface optical device of FIG. 16.

Figure 17A:
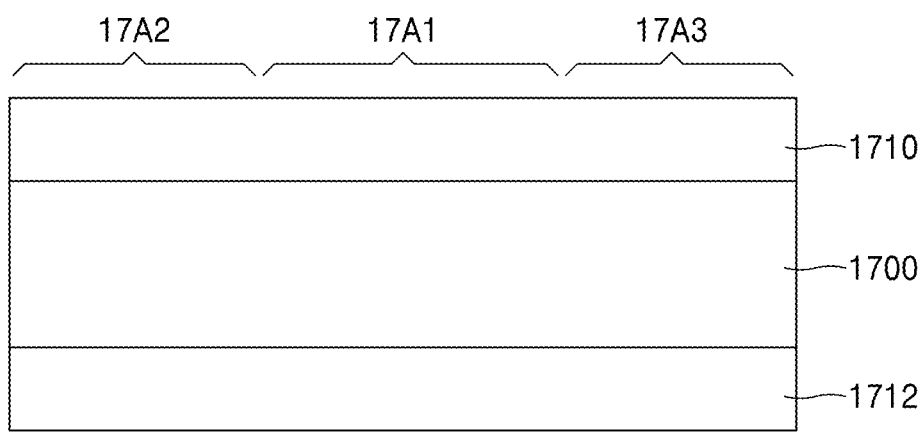
FIGS. 17A through 17I are cross-sectional views of an exemplary method of manufacturing the meta-surface optical device of FIG. 16.

Referring to FIG. 17A, the first meta-material layer 1710 is formed on an upper surface of the transparent substrate 1700. The first meta-material layer 1710 may include any of various dielectric materials, for example, amorphous silicon a-Si, titanium oxide (for example, $TiO_2$), or silicon nitride (for example, $Si_3N_4$). The first meta-material layer 1710 may include a first region 17A1, on which a meta-surface will be formed in a subsequent process, and second and third regions 17A2 and 17A3, on which alignment key patterns 114 and 116 will be formed in a subsequent process. The second meta-material layer 1712 is formed on the bottom surface of the transparent substrate 1700.

Figure 17B:
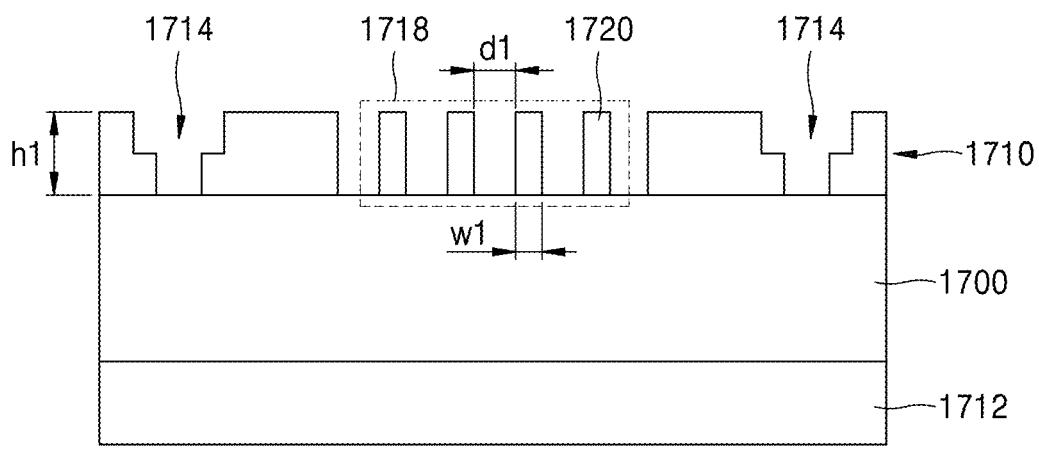

As depicted in FIG. 17B, the first meta-surface 1718 and the first alignment key patterns 1714 are formed by patterning the first meta-material layer 1710 using, for example, the method described with reference to FIG. 1B.

Figure 17C:
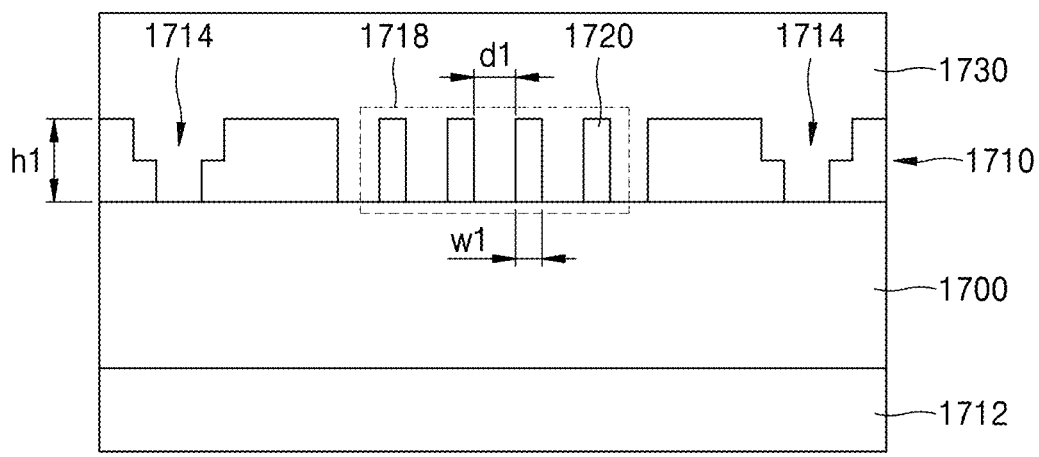

As depicted in FIG. 17C, the first cladding layer 1730 is formed, completely covering the first meta-surface 1718, the first alignment key patterns 1714, and exposed regions of the upper surface of the transparent substrate 1700, and the upper surface of the first cladding layer 1730 is planarized. Accordingly, the first meta-surface 1718, the first alignment key patterns 1714, and exposed portions of the transparent substrate 1700 are covered by the first cladding layer 1730. The first cladding layer 1730 may be an SOG layer, but is not limited thereto.

Figure 17D:
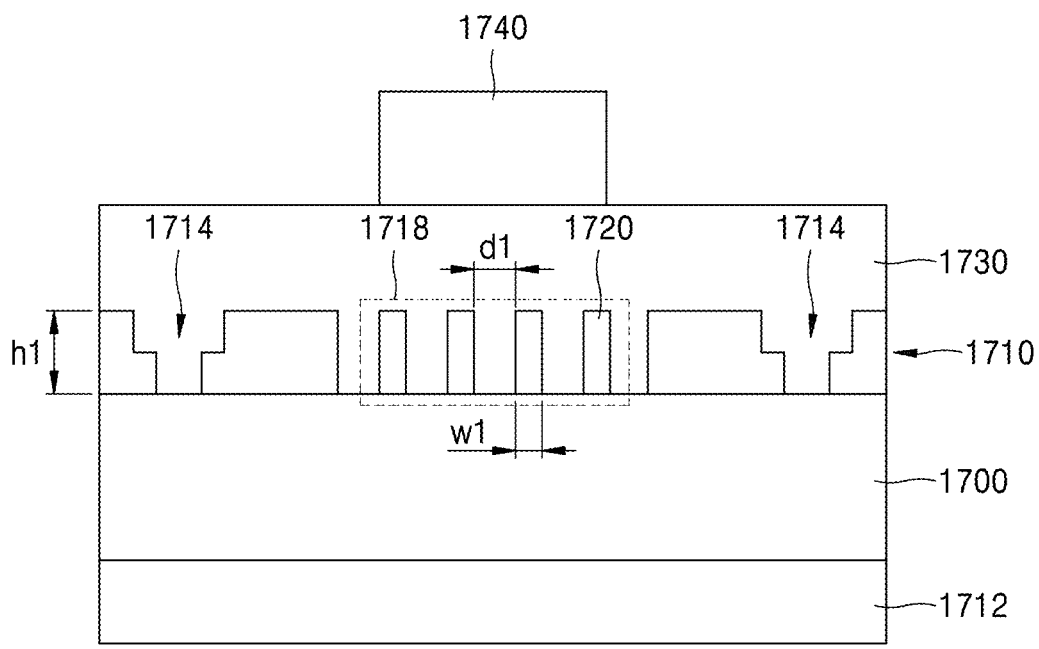

As depicted in FIG. 17D, a mask 1740, that covers a portion of the first cladding layer 1730 corresponding to the first meta-surface 1718 and exposes remaining portions of the first cladding layer 1730, is formed on the first cladding layer 1730. The mask 1740 may be a photo-sensitive film.

Figure 17E:
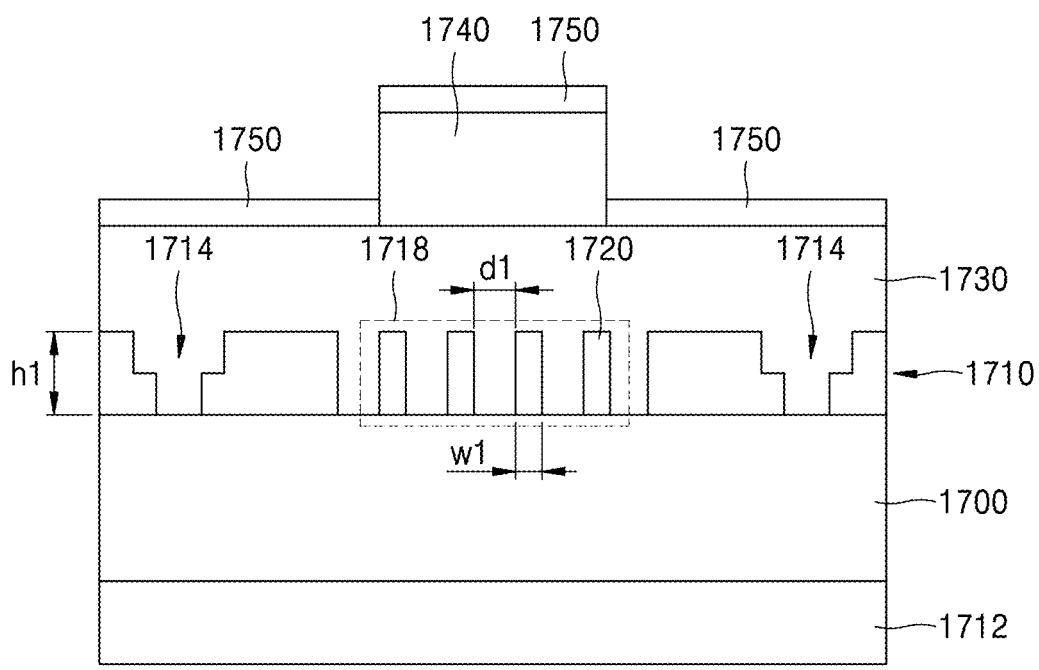
Figure 17F:
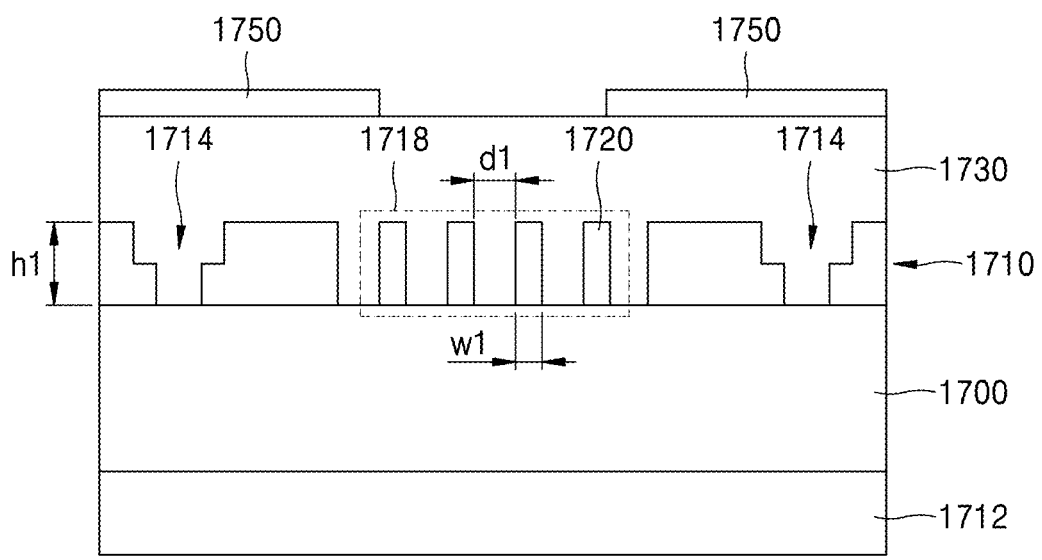

As depicted in FIG. 17E, the first light blocking layer 1750 is formed, covering the mask 1740 and exposed portions of the first cladding layer 1730. The first light blocking layer 1750 may be a light absorption layer or a light reflection layer. The first light blocking layer 1750 may be, for example, a metal layer or a polymer layer, but is not limited thereto. When the mask 1740 is removed by using a lift process, the portion of the first light blocking layer 1750 formed on the mask 1740 is also removed together with the mask 1740. As depicted in FIG. 17F, the first light blocking layer 1750 corresponding to the first meta-surface 1718 is removed, and only the first light blocking layer 1750 corresponding to peripheral regions of the first meta-surface 1718 remains.

Figure 17G:
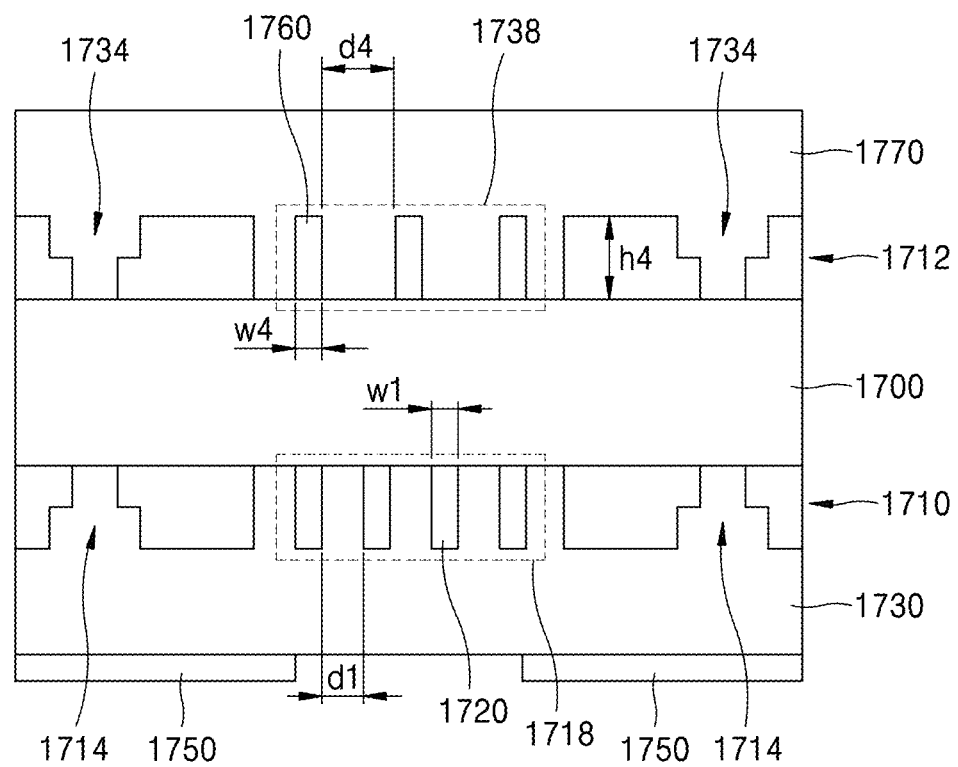

As depicted in FIG. 17G, the product of FIG. 17F may be turned over, such that the second meta-material layer 1712 is disposed placed above the transparent substrate 1700. As described, for example, with reference to FIG. 1B, the second meta-surface 1738 and the second alignment key patterns 1734, separated from the second meta-surface 1738 in the second meta-material layer 1712, are formed by patterning the second meta-material layer 1712. The second meta-surface 1738 is formed on a location corresponding to the location of the first meta-surface 1718, and the second alignment key patterns 1734 may be formed on locations corresponding to the locations of the first alignment key patterns 1714. The second cladding layer 1770 is formed on the second meta-surface 1738, the second alignment key patterns 1734, and exposed portions of the transparent substrate 1700. Accordingly, all of the second meta-material layer 1712, the second meta-surface 1738, the second alignment key patterns 1734, and exposed portions of the transparent substrate 1700 are covered by the second cladding layer 1770.

Figure 17H:
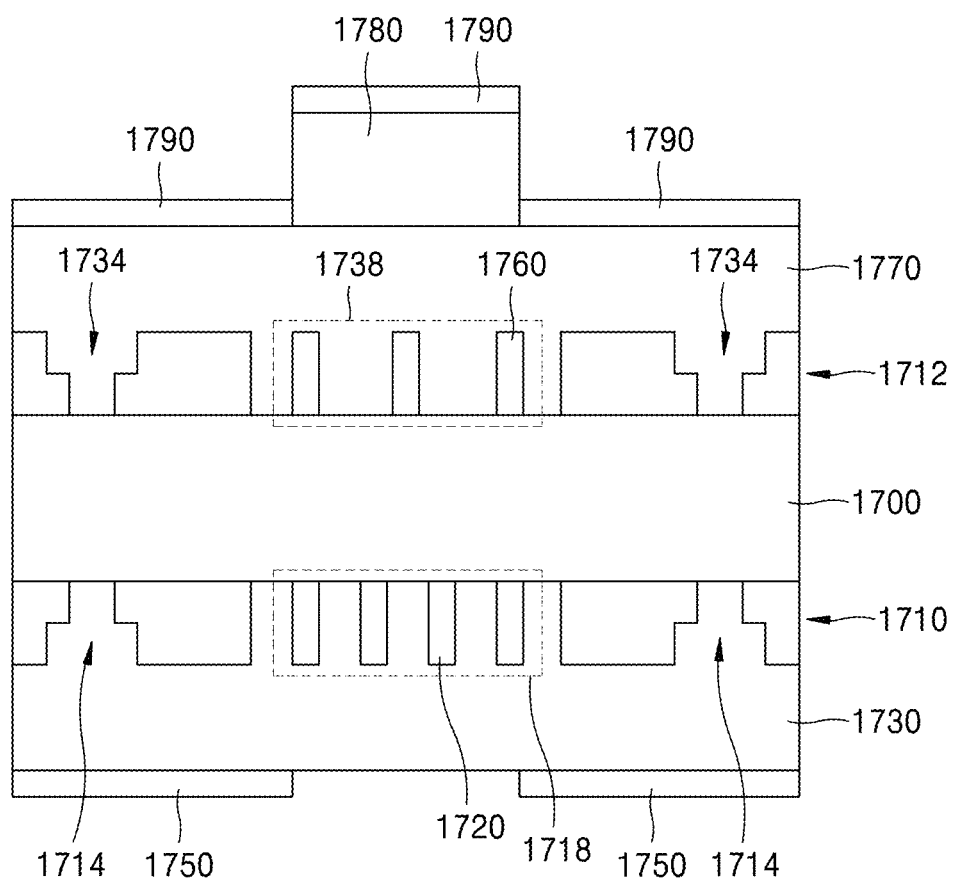

As depicted in FIG. 17H, a mask 1780 is formed only on a region of the second cladding layer 1770 corresponding to the second meta-surface 1738. The mask 1780 may be a photo-sensitive film. The second light blocking layer 1790 is formed, covering an upper surface of the mask 1780 and exposed regions of the second cladding layer 1770. The second light blocking layer 1790 may be a light absorption layer or a light reflection layer. The second light blocking layer 1790 may be made of the same material as the first light blocking layer 1750. After the second light blocking layer 1790 is formed, the mask 1780 is removed by using a lift-off process. The second light blocking layer 1790 formed on the mask 1780 is also removed together with the mask 1780.

Figure 17I:
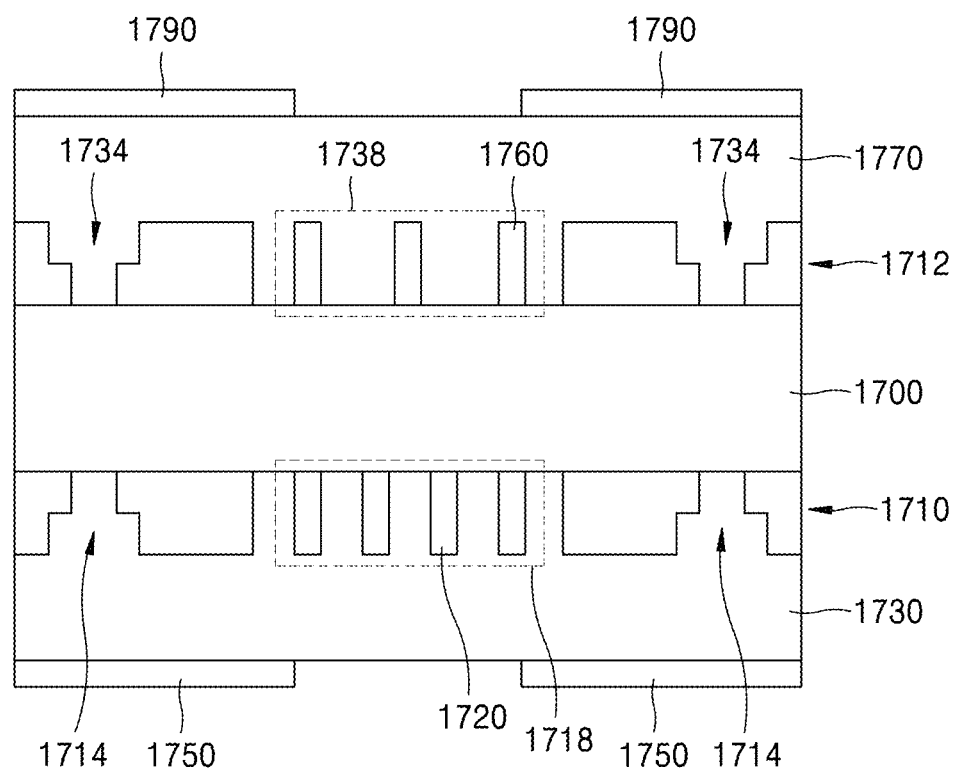

As a result, as depicted in FIG. 17I, a meta-surface optical device, having the second meta-surface 1738 and the first meta-surface 1718 respectively on and below the transparent substrate 1700 and that blocks light incident on peripheral regions of the second meta-surface 1738 and the first meta-surface 1718, may be formed.

Figure 18:
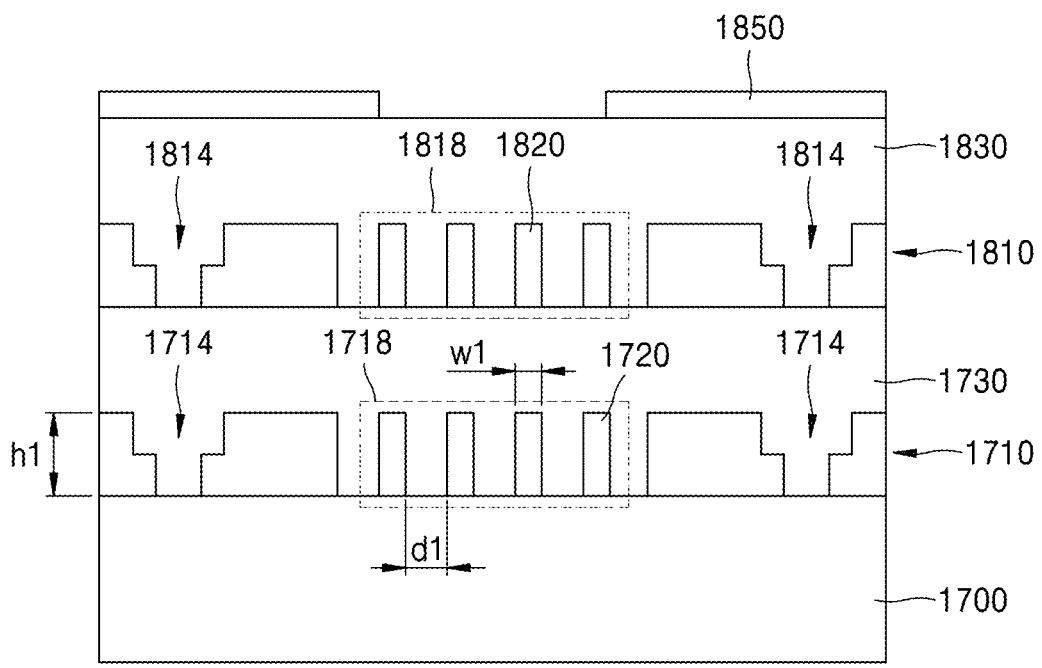
FIG. 18 is a cross-sectional view of a meta-surface optical device according to another exemplary embodiment.

FIG. 18 is a cross-sectional view of a meta-surface optical device according to another exemplary embodiment.

A plurality of meta-surfaces are formed on a transparent substrate 1700.

Referring to FIG. 18, a first meta-material layer 1710 including a first meta-surface 1718 and first alignment key patterns 1714 is formed on the transparent substrate 1700. The first meta-material layer 1710 is covered by a first cladding layer 1730, and a surface of the first cladding layer 1730 is flat. A second meta-material layer 1810 that includes a second meta-surface 1818 and second alignment key patterns 1814 is formed on the first cladding layer 1730. The second meta-surface 1818 may be made of the same material as the first meta-material layer 1710. The second meta-surface 1818 includes a plurality of patterns 1820. The patterns 1820 may have gaps, widths, and heights corresponding to the gaps d1, width w1, and height h1 of the patterns 1720 of the first meta-surface 1718. The second meta-material layer 1810 is covered by a second cladding layer 1830, and a surface of the second cladding layer 1830 is flat. A light blocking layer 1850 is arranged on the second cladding layer 1830. The light blocking layer 1850 is arranged on the third cladding layer 1830 except for a region of the second cladding layer 1830 corresponding to the second meta-surface 1818. The light blocking layer 1850 may be one of the light control members that change a progress of light or a direction of progress of light, and may be a light absorption layer or a light reflection layer. Also, the light blocking layer 1850 may be a metal layer or a polymer layer, but is not limited thereto.

FIGS. 19A through 19E are cross-sectional views of a method of manufacturing the meta-surface optical device of FIG. 18.

Figure 19A:
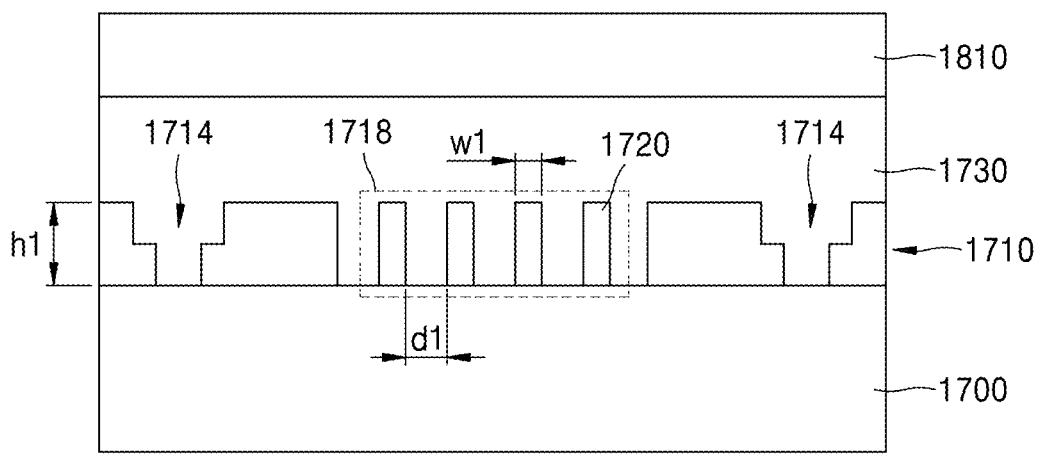
FIGS. 19A through 19E are cross-sectional views of an exemplary method of manufacturing the meta-surface optical device of FIG. 18.

Referring to FIG. 19A, after forming the first meta-material layer 1710 on the transparent substrate 1700, the first meta-surface 1718 and the first alignment key patterns 1714 are formed by patterning the first meta-material layer 1710. The first meta-surface 1718 and the first alignment key patterns 1714 may be formed, for example, by using a method described with reference to FIG. 1B. The first cladding layer 1730 covering the first meta-material layer 1710 is formed, and afterwards, an upper surface of the first cladding layer 1730 is planarized. The second meta-material layer 1810 is formed on the first cladding layer 1730. The second meta-material layer 1810 may include the same material as the first meta-material layer 1710.

Figure 19B:
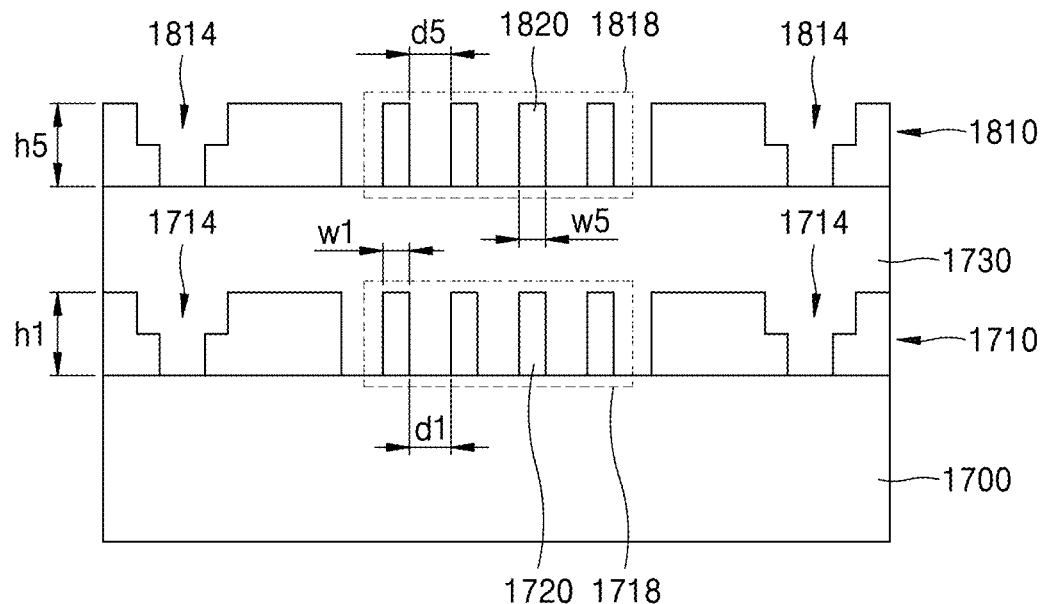

Next, as depicted in FIG. 19B, the second meta-surface 1818 and the second alignment key patterns 1814 are formed in the second meta-material layer 1810 by patterning the second meta-material layer 1810. Accordingly, the second meta-surface 1818 and the second alignment key patterns 1814 are formed on the first cladding layer 1730. The second meta-surface 1818 and the second alignment key patterns 1814 may be formed, for example, by using a method described with reference to FIG. 1B. The second meta-surface 1818 may be formed on a location corresponding to the location of the first meta-surface 1718, and the second alignment key patterns 1814 may be formed on locations corresponding to the locations of the first alignment key patterns 1714.

Figure 19C:
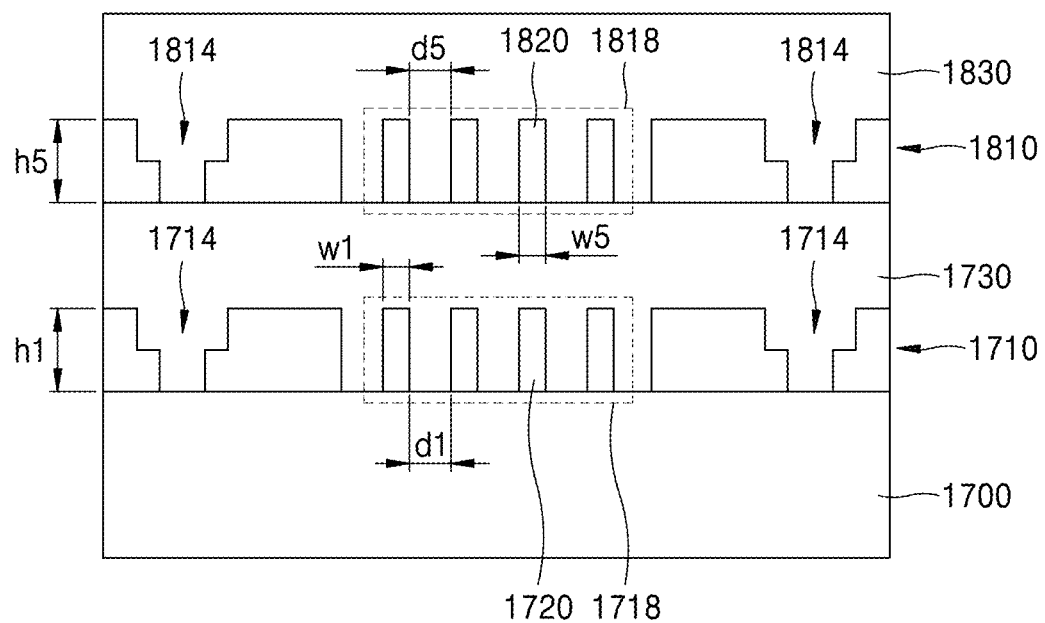

As depicted in FIG. 19C, the second cladding layer 1830 is formed, covering the second meta-surface 1818, the second meta-surface 1818, the second alignment key patterns 1814, and exposed portions of the first cladding layer 1730. Accordingly, all of the second meta-surface 1818, the second alignment key patterns 1814, and exposed portions of the first cladding layer 1730 are covered by the second cladding layer 1830. The second cladding layer 1830 may include the same material as the first cladding layer 1730.

Figure 19D:
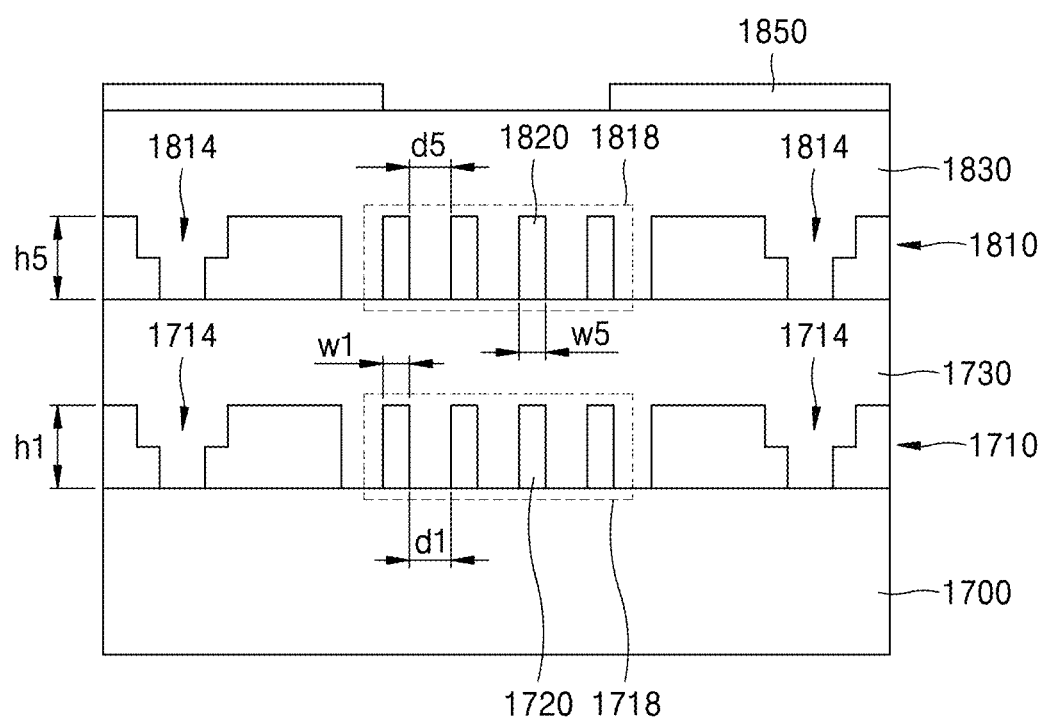

As depicted in FIG. 19D, the light blocking layer 1850 is formed on the second cladding layer 1830. The light blocking layer 1850 is formed only on a region of the second cladding layer 1830. The light blocking layer 1850 may be formed on a whole upper surface of the second cladding layer 1830 except for a region of the second cladding layer 1830 corresponding to the second meta-surface 1818. The light blocking layer 1850 may be a light absorption layer or a light reflection layer. The light blocking layer 1850 may be, for example, a metal layer or a polymer layer, but is not limited thereto.

In this way, the meta-surface optical device depicted in FIG. 18 may be formed.

Figure 19E:
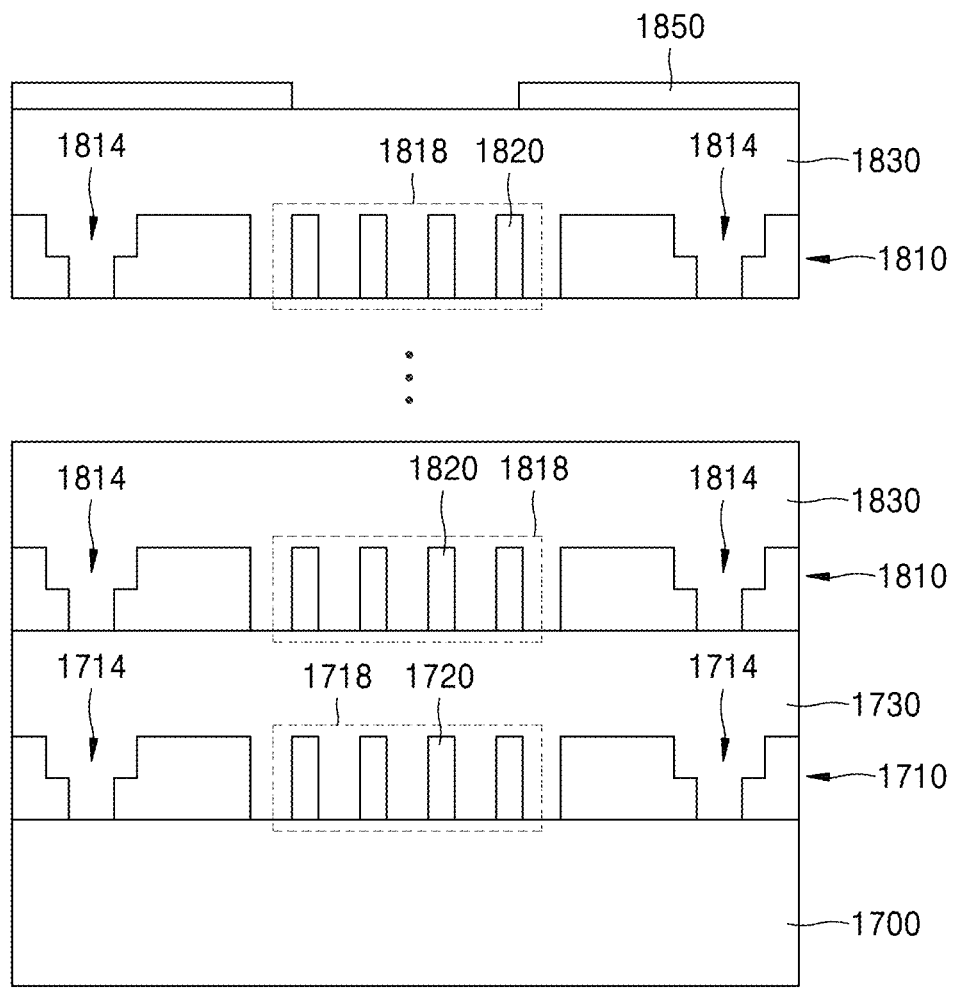

Alternatively, before forming the light blocking layer 1850 in FIG. 19D, as depicted in FIG. 19E, a process of stacking the second meta-material layer 1810 and the second cladding layer 1830 on the second cladding layer 1830 may further be performed at least one times. At this point, the light blocking layer 1850 may be formed on the uppermost cladding layer.

Figure 20A:
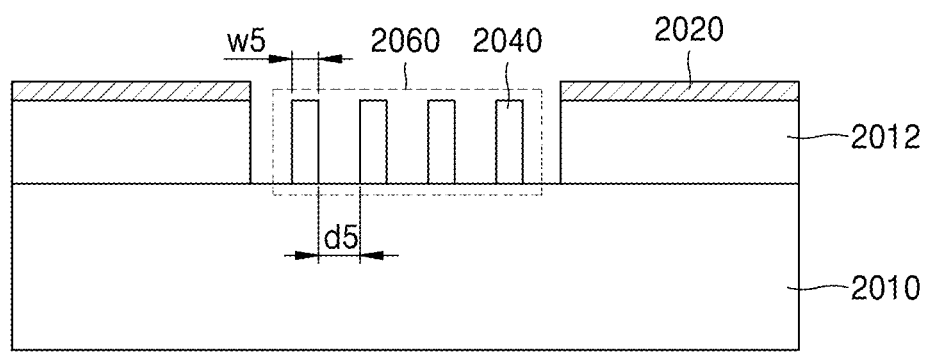
FIGS. 20A through 20C are cross-sectional views of a meta-surface optical device according to another exemplary embodiment.
Figure 20B:
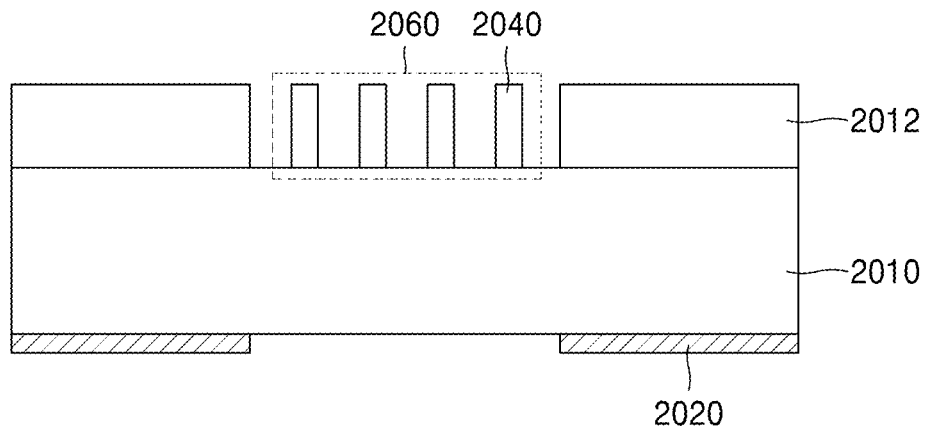
Figure 20C:
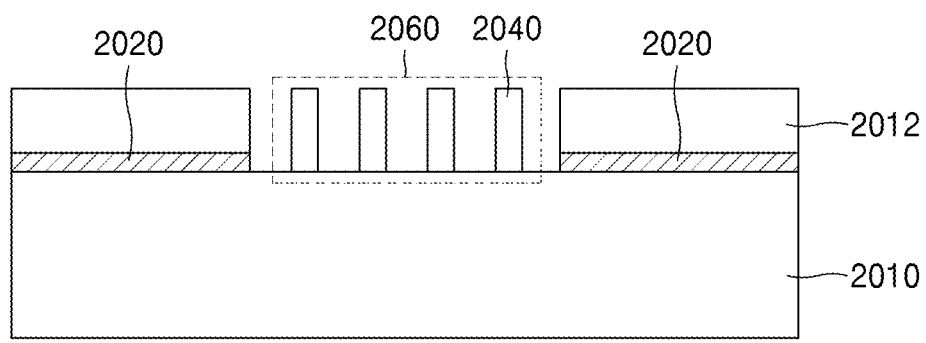

FIGS. 20A through 20C are cross-sectional views of a meta-surface optical device according to another exemplary embodiment.

Referring to FIG. 20A, a separated meta-material layer 2012 is formed on a transparent substrate 2010. The meta-material layer 2012 may include any of various dielectric materials, for example, amorphous silicon a-Si, titanium oxide (for example, $TiO_2$), or silicon nitride (for example, $Si_3N_4$). A meta-surface 2060 is formed between the separated meta-material layers 2012. The meta-surface 2060 includes a plurality of patterns 2040. The patterns 2040 are separated from each other by fifth gaps d5, and have a width w5 and a height h5. The fifth gaps d5 and the width w5 are less than a wavelength of incident light. The patterns 2040 may include the same material as the meta-material layer 2012. A light blocking film 2020 is provided on the meta-material layer 2012. The light blocking film 2020 covers a whole upper surface of the meta-material layer 2012. The light blocking film 2020 may be a light reflection layer or a light absorption layer. The light blocking film 2020 may be, for example, a metal layer or a polymer layer, but is not limited thereto.

As depicted in FIG. 20B, the light blocking film 2020 of FIG. 20A may be arranged on a bottom surface of the transparent substrate 2010. Also, as depicted in FIG. 20C, the light blocking film 2020 may be arranged between the transparent substrate 2010 and the meta-material layer 2012.

FIGS. 21A through 21G are cross-sectional views of a method of manufacturing the meta-surface optical device of FIG. 20A.

Figure 21A:
FIGS. 21A through 21G are cross-sectional views of an exemplary method of manufacturing the meta-surface optical device of FIG. 20A.

Referring to FIG. 21A, the meta-material layer 2012 and the light blocking layer 2020 are sequentially stacked on the transparent substrate 2010.

Figure 21B:
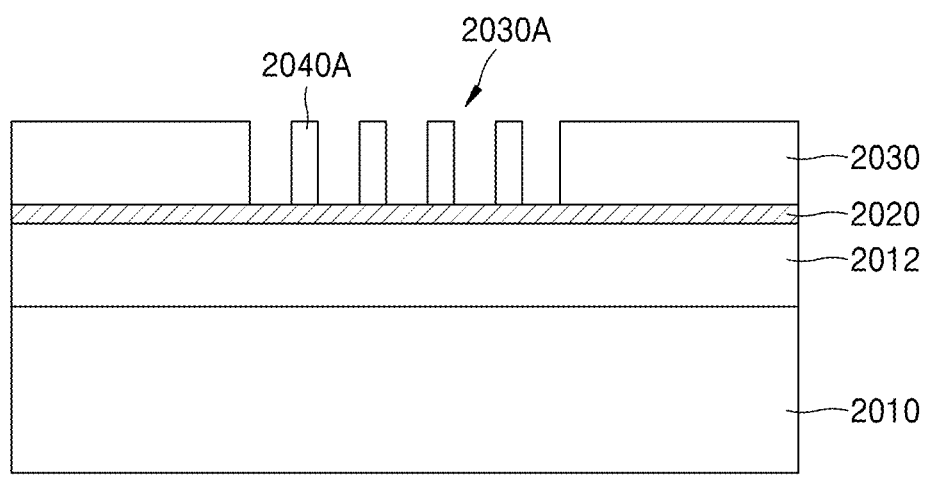

As depicted in FIG. 21B, a mask layer 2030 is formed on the light blocking layer 2020. The mask layer 2030 may be a photo-sensitive film layer. The mask layer 2030 includes a pattern region 2030A including a plurality of patterns 2040A. The patterns 2040A are separated from each other, and thus, the light blocking layer 2020 is exposed through gaps between the patterns 2040A. The pattern region 2030A defines a region in which a meta-surface will be formed. Exposed portions of the light blocking layer 2020 are etched in a state in which the mask layer 2030 is present. The etching is continued until the meta-material layer 2012 is exposed.

Figure 21C:
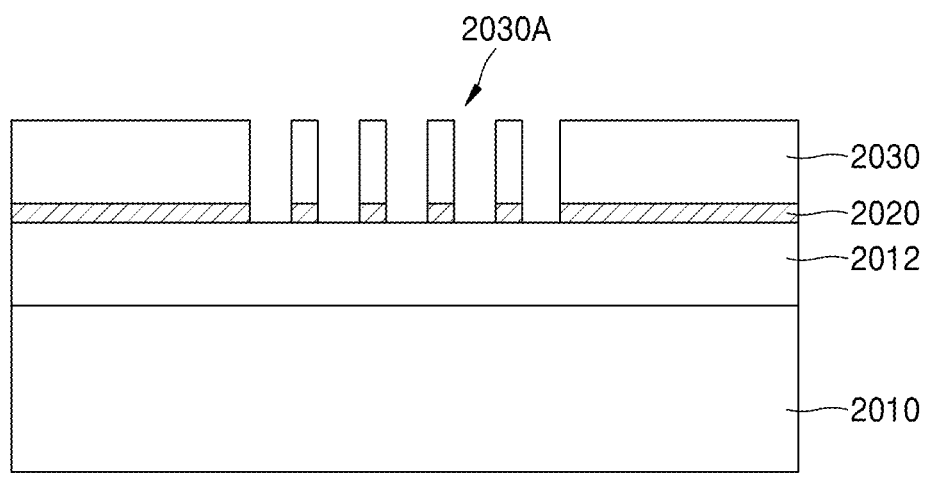
Figure 21D:
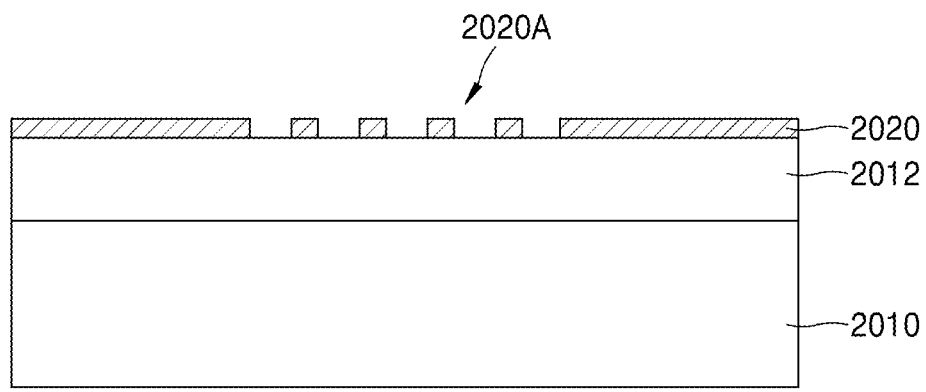
Figure 21E:
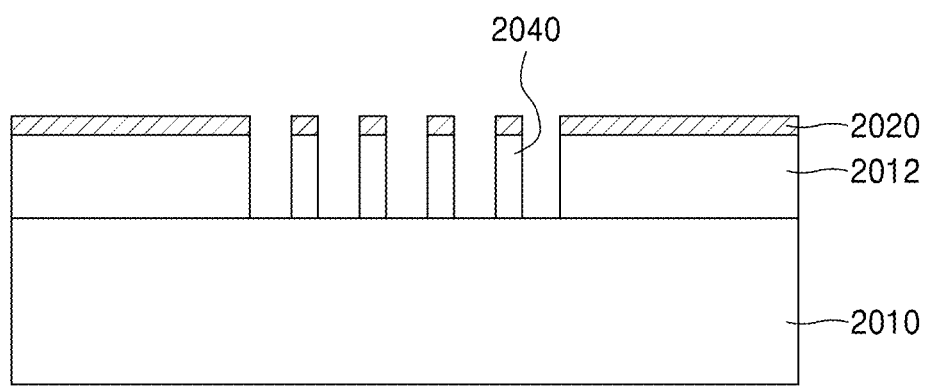

As a result of the etching, as depicted in FIG. 21C, the whole pattern region 2030A of the mask layer 2030 is transferred to the light blocking layer 2020. When the mask layer 2030 is removed, as depicted in FIG. 21D, a pattern region 2020A, formed by transferring the pattern region 2030A of the mask layer 2030, is formed in the light blocking layer 2020 on the meta-material layer 2012. The light blocking layer 2020 is used as a mask in a subsequent process. That is, as depicted in FIG. 21E, the meta-material layer 2012 is etched by using the light blocking layer 2020 including the pattern region 2020A. The etching may be continued until the transparent substrate 2010 is exposed. As a result of the etching, a meta-surface including a plurality of patterns 2040 is formed in the meta-material layer 2012.

Figure 21F:
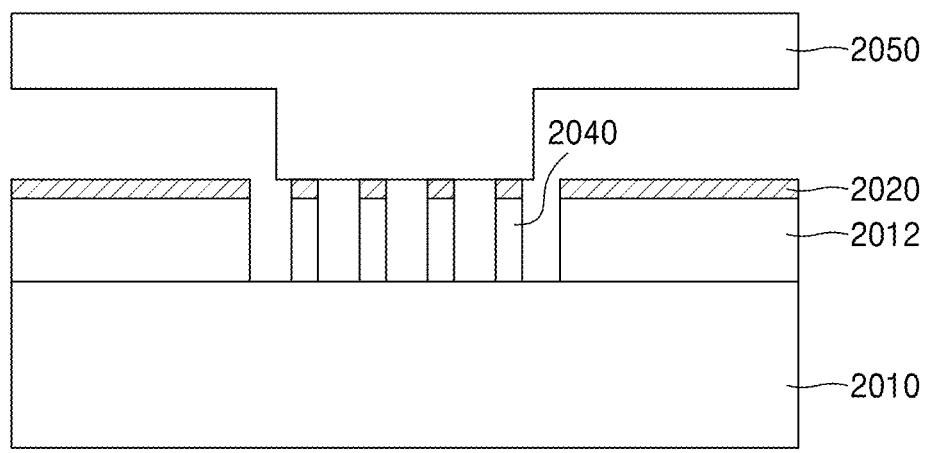
Figure 21G:
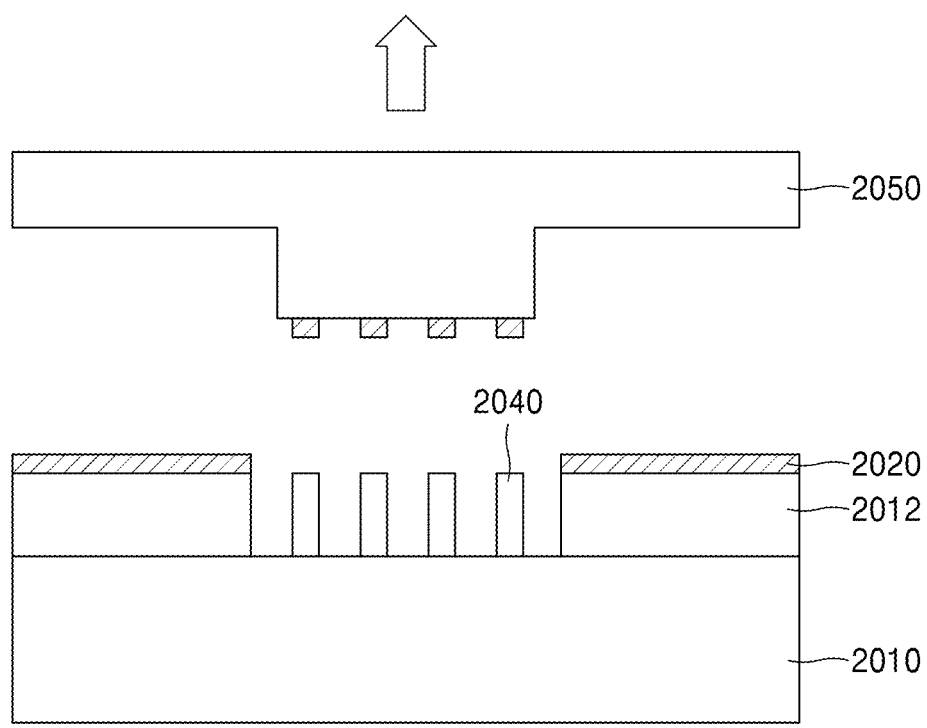

As depicted in FIGS. 21F and 21G, the pattern region 2020A is removed from the light blocking layer 2020 by using a stamp 2050. The stamp 2050 may include any of various polymers including polydimethylsiloxane (PDMS).

In this way, the meta-surface optical device depicted in FIG. 20A is formed. The meta-surface optical devices of FIGS. 20B and 20C may be readily formed by changing the locations of the light blocking layer in the process of forming the meta-surface optical element depicted in FIG. 20A.

Figure 22:
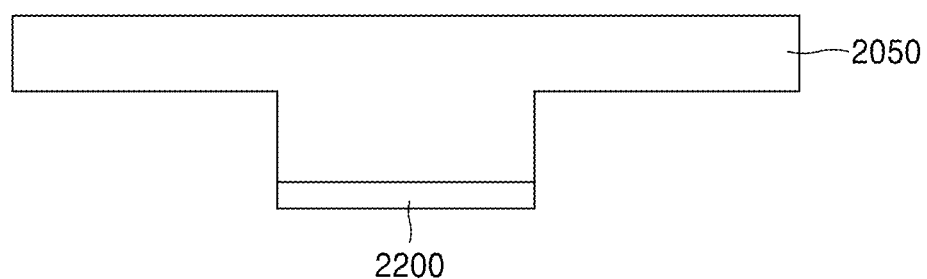
FIG. 22 is a cross-sectional view showing a case in which a material layer having a high adhesion force with respect to a light blocking layer is attached to a surface of a stamp to be attached to a pattern region.

Also, as depicted in FIG. 22, when a material layer 2200 having a high adhesiveness with respect to the light blocking layer 2020 is attached to a surface of the stamp 2050 that is attached to the pattern region 2020A, the selectivity of the stamp 2050 with respect to the pattern region 2020A may be increased in the process of removing the pattern region 2020A using the stamp 2050.

Figure 23:
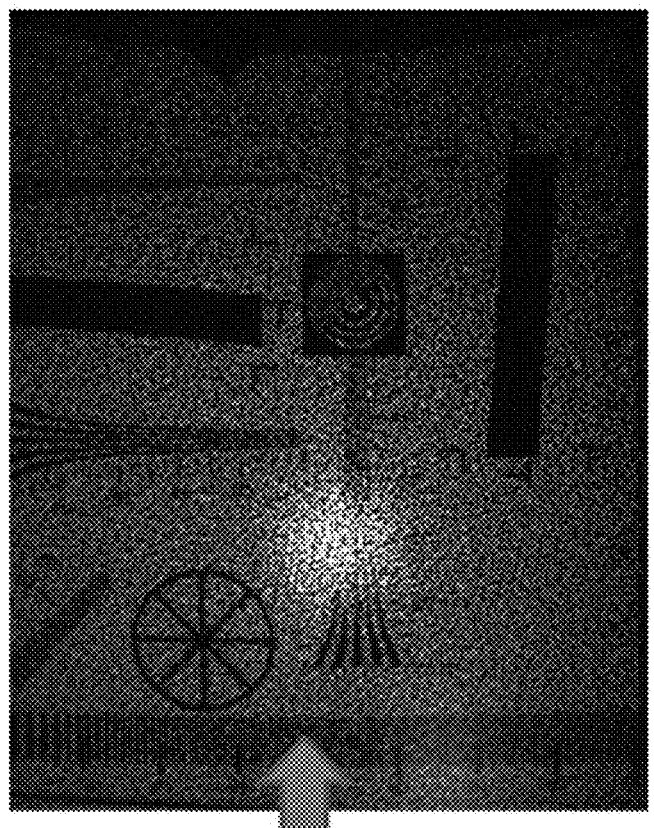
FIG. 23 is photographs showing an effect of the use of meta-surface optical devices according to exemplary embodiments.
Figure 23:
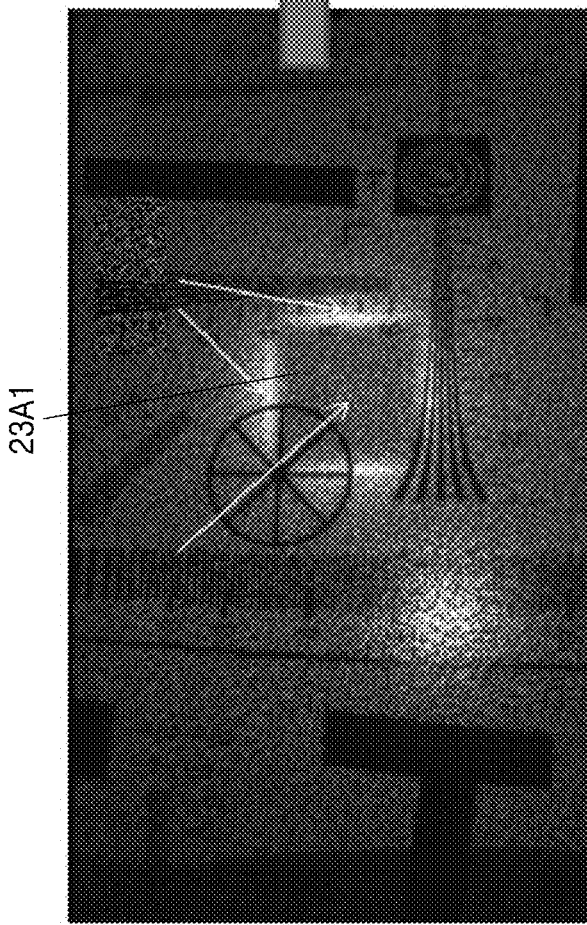

FIG. 23 is photographs showing an effect of the use of meta-surface optical devices according to exemplary embodiments.

The photograph on the left side shows a case in which a conventional optical element is used and the photograph on the right side shows a case in which a meta-surface optical device according to an exemplary embodiment is used.

Referring to FIG. 23, in the left photograph, bright regions, which are defects, are present along a boundary of a region 23A1 corresponding to a meta-surface. However, in the right photograph, the defect is not observed.

Accordingly, this shows that, when a meta-surface optical device, according to an exemplary embodiments is used, the quality of an image (for example, a structured optical pattern) formed by the meta-surface may be increased.

Figure 24:
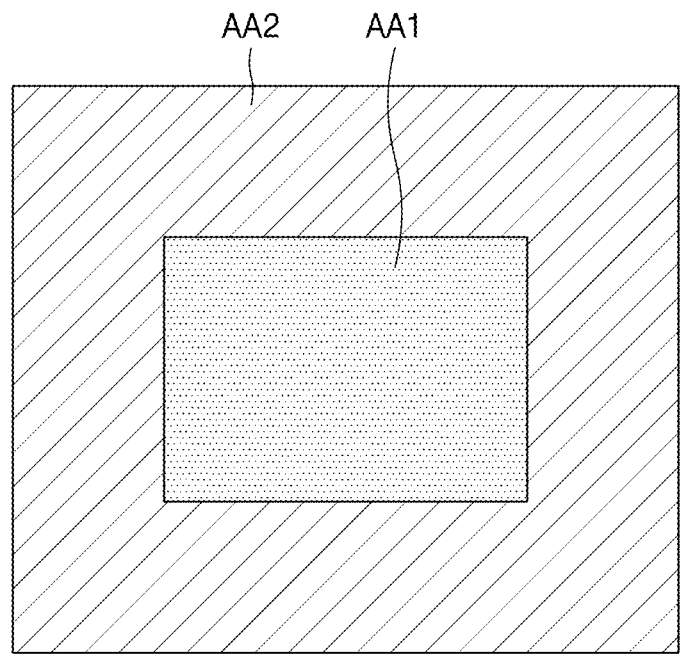
FIG. 24 is a plan view of an exemplary correct alignment between a meta-surface and a light control member.

FIG. 24 shows a case in which a meta-surface region AA1 and a light control member region AA2 are correctly aligned in a meta-surface optical device 2300.

Figure 25:
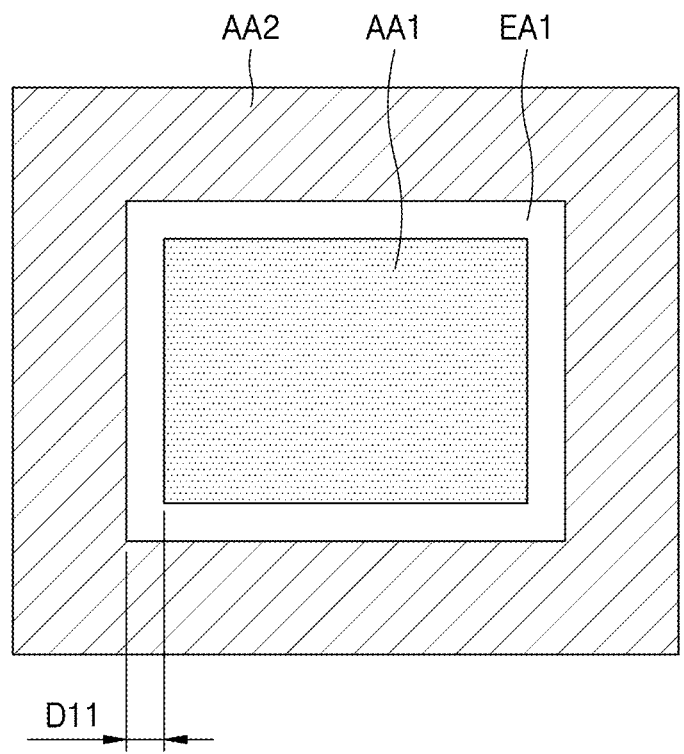
FIG. 25 is a plan view of an exemplary incorrect alignment between a meta-surface and a light control member.

FIG. 25 shows a case in which a gap EA1, having a width D11, is present between the meta-surface region AA1 and the light control member region AA2. As depicted in FIG. 28, in order to obtain a clean structured optical pattern without light-leaking defect, the size of the gap EA1 may be less than six times a wavelength of incident light. That is, if the size of the gaps EA1 do not exceed six times of a wavelength of incident light, a zero-order-effect does not occur.

For example, if a wavelength of incident light is 940 nm, and a size of the gap EA1 is within approximately 5 μm, as depicted in FIG. 28, a clean structured optical pattern without a zero-order-effect may be obtained.

Figure 26:
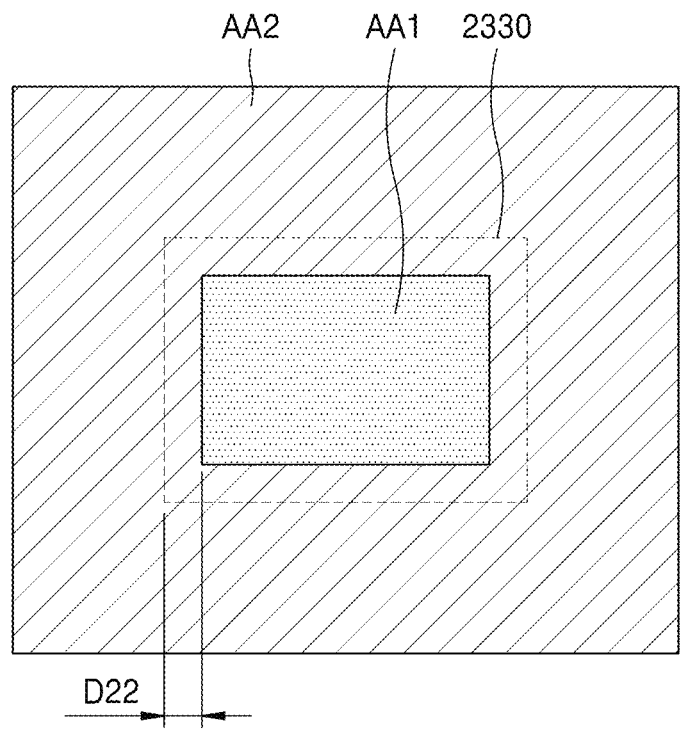
FIG. 26 is a plan view of another exemplary incorrect alignment between a meta-surface and a light control member.

FIG. 26 shows a case in which the light control member region AA2 overlaps the meta-surface region AA1. When the light control member region AA2 overlaps the meta-surface region AA1 by as much as a distance D22 from a boundary 2330 therebetween, that is, when width D22 of the overlap of the light control member region AA2 with the meta-surface region AA1 is less than ten times the wavelength of incident light, the zero-order-effect may not occur. For example, if a wavelength of incident light is 940 nm, and a width of the overlap is within approximately 9 μm, a clean structured optical pattern without a zero-order-effect may be obtained.

Figure 27A:
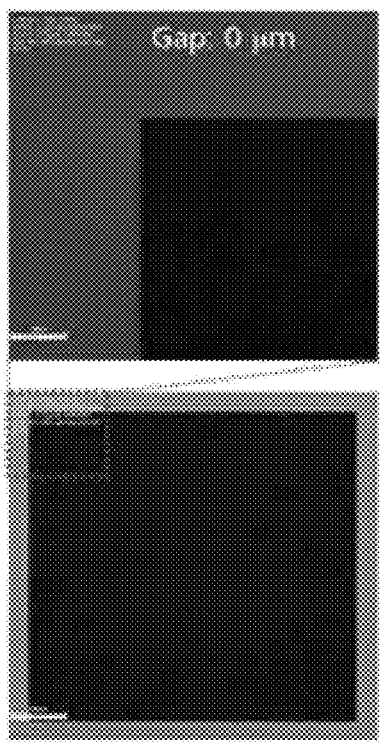
FIGS. 27A, 27B, and 27C are photographs illustrating are photographs illustrating three exemplary alignment states of meta-surfaces and light control members.
Figure 27B:
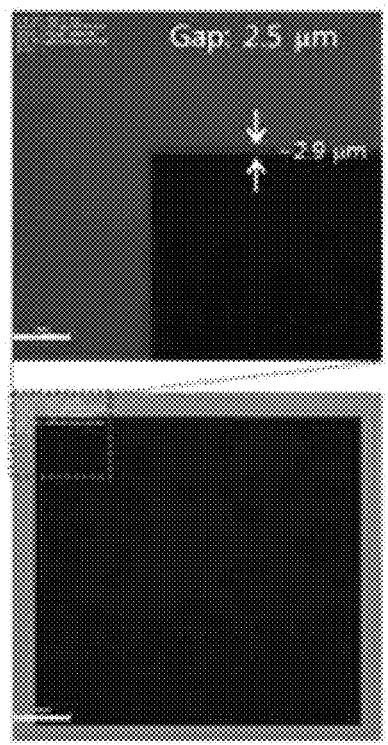
Figure 27C:
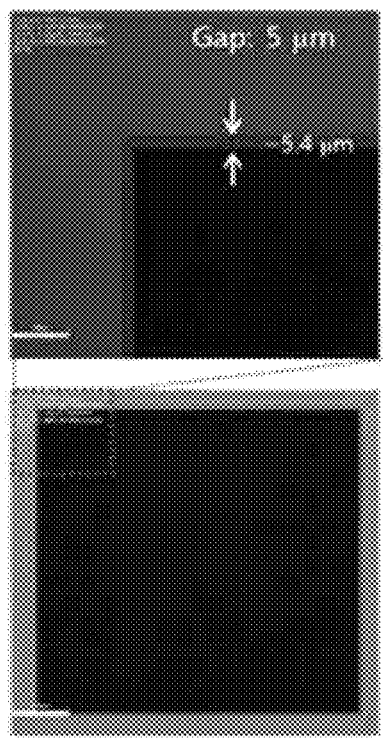

FIGS. 27A, 27B, and 27C are photographs showing actually measured results with respect to three alignment states of meta-surfaces and light control members around the meta-surfaces.

FIG. 27A, shows a photograph of a state in which the meta-surface and the light control member are correctly aligned; FIG. 27B shows a photograph of a state in which a gap having a width of 2.5 μm is present between the meta-surface and the light control member; and FIG. 27C shows a photograph of a state in which a gap having a width of approximately 5 μm is present.

Figure 28A:
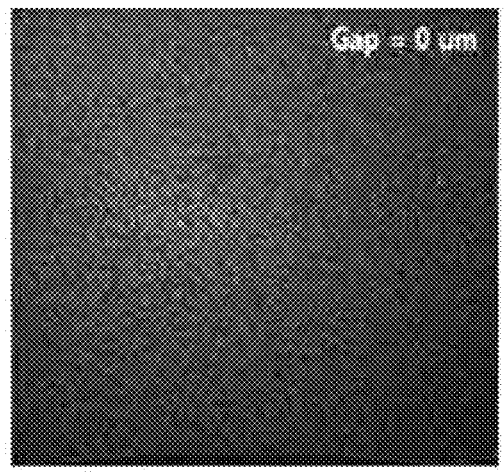
FIGS. 28A, 28B, and 28C are photographs of structured optical patterns obtained using meta surface optical devices aligned as shown in FIGS. 27A, 27B, and 27C, respectively.
Figure 28B:
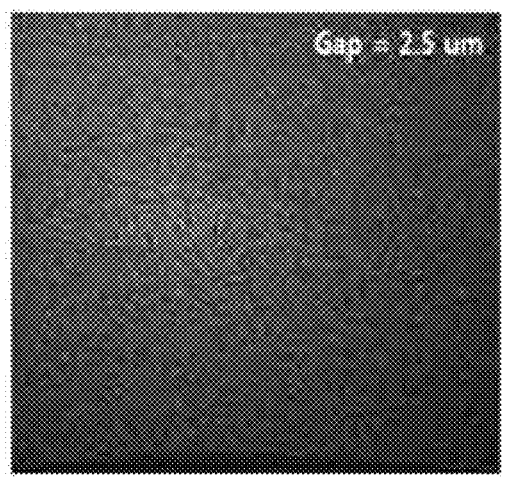
Figure 28C:
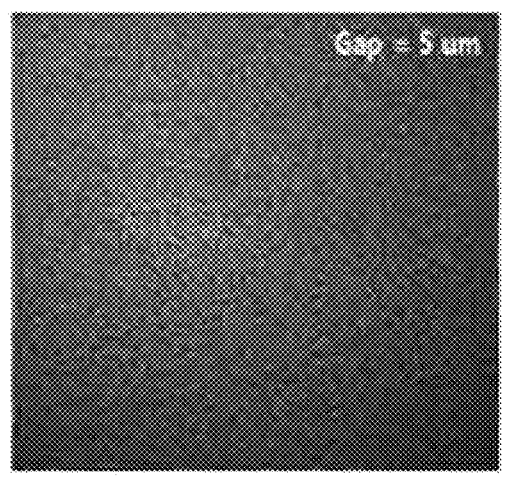

FIGS. 28A, 28B, and 28C are photographs of structured optical patterns obtained using meta surface optical devices aligned as shown in FIGS. 27A, 27B, and 27C, respectively.

Referring to FIG. 28, when the gaps between the meta-surface and the light control member are 0 μm, 2.5 μm, and 5 μm, respectively, the zero-order-effect was not observed.

While one or more exemplary embodiments have been described with reference to the figures, it will be understood by those of ordinary skill in the art that various changes in form and details may be made therein without departing from the spirit and scope as defined by the following claims.

What is claimed is:

1. A meta-surface optical device comprising:
 a transparent substrate;
 a meta-surface comprising a plurality of first columnar patterns provided on a first region of an upper surface of the transparent substrate; and
 a light control member comprising a plurality of second columnar patterns provided on a second region of the upper surface of the transparent substrate and configured to prevent light transmission,
 wherein the plurality of first columnar patterns have a same height as the plurality of second columnar patterns and the plurality of second columnar patterns are configured to surround an entirety of the first region in which the meta-surface is provided, and
 wherein the plurality of first columnar patterns and the plurality of second columnar patterns are made of a dielectric material.

2. The meta-surface optical device of claim 1, wherein the plurality of second columnar patterns and the plurality of first columnar patterns comprise a same material.

3. The meta-surface optical device of claim 1, wherein the plurality of second columnar patterns uniformly distribute on an entirety of the second region.

4. The meta-surface optical device of claim 1, wherein the plurality of first columnar patterns are meta-patterns having a dimension different from the plurality of second columnar patterns.

5. The meta-surface optical device of claim 1, wherein the plurality of second columnar patterns are configured to reflect light incident thereon.

6. The meta-surface optical device of claim 1, wherein the plurality of second columnar patterns are configured to absorb light incident thereon.

7. The meta-surface optical device of claim 1, wherein the plurality of second columnar patterns comprise alignment key patterns and
 wherein the light control member further comprises light absorption layer configured to cover the alignment key patterns.

8. The meta-surface optical device of claim 1, wherein the plurality of second columnar patterns comprise alignment key patterns and
 wherein the light control member further comprises light reflection layer configured to cover the alignment key patterns.

9. The meta-surface optical device of claim 1, further comprising a gap between the meta-surface and the light control member, wherein a width of the gap is less than or equal to 5 μm.

10. The meta-surface optical device of claim 1, wherein the meta-surface and the light control member overlap with each other, and a width of overlap between the meta-surface and the light control member is less than or equal to 9 μm.

11. A method of manufacturing a meta-surface optical device, the method comprising:
 forming a material layer on an upper surface of a transparent substrate; and
 patterning the material layer,
 wherein the patterning the material layer comprises:
  forming a meta-surface comprising a plurality of first columnar patterns on a first region of the upper surface of the transparent substrate; and
  forming a light control member comprising a plurality of second columnar patterns on a second region of the one upper surface of the transparent substrate,
 wherein the plurality of first columnar patterns have a same height as the plurality of second columnar patterns and the plurality of second columnar patterns are configured to surround an entirety of the first region in which the meta-surface is provided,
 wherein the plurality of first columnar patterns and the plurality of second columnar patterns are made of a dielectric material, and
 wherein the meta-surface and the light control member are formed in a same operation.

12. The method of claim 11, wherein the plurality of second columnar patterns are configured to reflect light incident thereon.

13. The method of claim 11, wherein the plurality of second columnar patterns and the plurality of first columnar patterns comprise a same material.

14. The method of claim 11, wherein the light control member comprises a plurality of second columnar patterns uniformly distributed on an entirety of the second region.

15. The method of claim 11,
 wherein the plurality of first columnar patterns are meta-patterns having a dimension different from the plurality of second columnar patterns.

16. The method of claim 11, further comprising a gap between the meta-surface and the light control member, wherein a width of the gap is less than or equal to 5 µm.

17. The method of claim 11, wherein the meta-surface and the light control member overlap with each other, and a width of overlap between the meta-surface and the light control member is less than or equal to 9 µm.

18. A method of manufacturing a meta-surface optical device, the method comprising:
   forming a meta-surface on a light incident side of a substrate, the meta-surface comprising a plurality of first columnar patterns provided on a first region of an upper surface of the substrate; and
   forming a light control member surrounding the meta-surface on the upper surface of the substrate, the light control member comprising a plurality of second columnar patterns,
   wherein the meta-surface is configured to perform a first operation with respect to the light incident on an upper surface of the meta-surface,
   wherein the light control member is configured to perform a second operation, different from the first operation, with respect to light incident on a surface of the light control member,
   wherein the plurality of second columnar patterns are configured to surround an entirety of the first region in which the meta-surface is provided,
   wherein the plurality of first columnar patterns and the plurality of second columnar patterns are made of a dielectric material,
   wherein the second operation is absorptive operation, and
   wherein a gap configured to remove a zero-order effect is formed between the meta-surface and the light control member and a width of the gap is less than or equal to 5 µm.

* * * * *